(12) United States Patent
Tikhonov et al.

(10) Patent No.: US 12,519,137 B2
(45) Date of Patent: Jan. 6, 2026

(54) PRINTED ELECTROCHEMICAL CELLS WITH ZINC SALTS AND METHODS OF FABRICATING THEREOF

(71) Applicant: CCL LABEL, INC., Framingham, MA (US)

(72) Inventors: Konstantin Tikhonov, San Leandro, CA (US); Chaojun Shi, Fremont, CA (US); Christine Ho, Fremont, CA (US); Jesse Smithyman, Oakland, CA (US); Alex Gurr, Oakland, CA (US); Danny Hellebusch, Oakland, CA (US); Ehsan Faegh, Alameda, CA (US); Albert Aumentado, San Pablo, CA (US); Pavel Khokhlov, San Ramon, CA (US)

(73) Assignee: CCL LABEL, INC., Framingham, MA (US)

( * ) Notice: Subject to any disclaimer, the term of this patent is extended or adjusted under 35 U.S.C. 154(b) by 0 days.

(21) Appl. No.: 17/809,832

(22) Filed: Jun. 29, 2022

(65) Prior Publication Data
US 2022/0416306 A1 Dec. 29, 2022

Related U.S. Application Data

(60) Provisional application No. 63/216,104, filed on Jun. 29, 2021.

(51) Int. Cl.
*H01M 50/10* (2021.01)
*H01M 4/04* (2006.01)
(Continued)

(52) U.S. Cl.
CPC ..... *H01M 10/0585* (2013.01); *H01M 4/0402* (2013.01); *H01M 4/661* (2013.01);
(Continued)

(58) Field of Classification Search
CPC .. H01M 10/0585; H01M 50/10; H01M 50/30; H01M 50/402; H01M 50/403
See application file for complete search history.

(56) References Cited

U.S. PATENT DOCUMENTS 9,076,589 B2 7/2015 Wright et al.
10,784,540 B2 9/2020 Shi et al.
(Continued)

FOREIGN PATENT DOCUMENTS

KR 100329855 B1 3/2002

OTHER PUBLICATIONS

International Application No. PCT/US2022/073267, Search Report and Written Opinion mailed Oct. 26, 2022, 11 pgs.

*Primary Examiner* — Osei K Amponsah
(74) *Attorney, Agent, or Firm* — McDonald Hopkins LLC

(57) ABSTRACT

Provided are printed electrochemical cells, which utilize zinc salts for ionic transfer, and methods of fabricating such cells. In some examples, a printed electrochemical cell comprises a positive electrode with a positive current collector having a two-dimensional shape and comprising an electrolyte-facing surface formed by the graphite. For example, the positive current collector may be a graphite foil or an aluminum foil with a graphite coating. The cell also comprises electrolyte comprising an electrolyte salt and an electrolyte solvent. For example, the electrolyte salt comprises a zinc salt with a concentration of at least 30% by weight in the electrolyte. The cell is fabricated by printing a positive active material layer over the positive current collector, printing one or more electrolyte layers on various cell components, and laminating a separator layer between the positive and negative electrodes while soaking the separator layer with the electrolyte.

8 Claims, 18 Drawing Sheets

(51) Int. Cl.
  *H01M 4/66*      (2006.01)
  *H01M 10/0568*   (2010.01)
  *H01M 10/0585*   (2010.01)
  *H01M 50/30*     (2021.01)
  *H01M 50/403*    (2021.01)
  *H01M 50/431*    (2021.01)
  *H01M 50/446*    (2021.01)
  *H01M 4/02*      (2006.01)

(52) U.S. Cl.
  CPC ........... *H01M 4/663* (2013.01); *H01M 4/667* (2013.01); *H01M 10/0568* (2013.01); *H01M 50/10* (2021.01); *H01M 50/30* (2021.01); *H01M 50/403* (2021.01); *H01M 50/431* (2021.01); *H01M 50/446* (2021.01); *H01M 2004/028* (2013.01)

(56) References Cited

U.S. PATENT DOCUMENTS

| | | | |
|---|---|---|---|
| 11,171,328 B2 | 11/2021 | Zheng et al. | |
| 2001/0051298 A1* | 12/2001 | Hanafusa | H01M 50/105 429/162 |
| 2006/0216586 A1* | 9/2006 | Tucholski | H01M 50/186 429/185 |
| 2011/0311857 A1 | 12/2011 | Tucholski | |
| 2013/0089769 A1 | 4/2013 | Proctor et al. | |
| 2013/0280579 A1* | 10/2013 | Wright | H01G 9/0029 429/188 |
| 2020/0280056 A1 | 9/2020 | Zheng et al. | |
| 2020/0411866 A1 | 12/2020 | Mackenzie et al. | |

\* cited by examiner

At least one of the following three electrolyte printing operations

| Print Electrolyte Layer over Positive Active Material Layer 462 | Print Electrolyte Layer over Negative Active Material Layer 464 | Print Electrolyte Layer on Separator 466 |

*FIG. 4B*

PRINTED ELECTROCHEMICAL CELLS WITH ZINC SALTS AND METHODS OF FABRICATING THEREOF

CROSS-REFERENCE TO RELATED APPLICATIONS

This application claims the benefit under 35 U.S.C. § 119(e) of U.S. Provisional Patent Application No. 63/216,104, filed on 2021 Jun. 29, which is incorporated herein by reference in its entirety for all purposes.

BACKGROUND

The reduction in size and performance improvements of electronic devices and batteries have opened doors to new applications, such as low-power sensors, wireless transmitters, printed electronics, and the like. While thin-film batteries, lithium polymer batteries, and semi-printed batteries have been considered in the past for these applications, each one of these battery types has significant shortcomings, which have limited its adoption. For example, vapor-deposited thin-film batteries have low energy storage capacities and power capabilities due to various limitations of the deposition process. Lithium polymer batteries are sensitive to operating and environmental conditions and require special monitoring circuits. Semi-printed batteries typically use liquid electrolytes, creating sealing issues and potentially causing electrolyte leaks in these batteries. Furthermore, integrating multiple layers in semi-printed batteries has been challenging and expensive.

SUMMARY

Provided are printed electrochemical cells, which utilize zinc-based negative electrodes. Also provided are methods of fabricating such cells. In some examples, a printed electrochemical cell comprises a positive electrode with a positive current collector having a two-dimensional shape (e.g., a substantially planar shape in some examples). Furthermore, the positive current collector comprises an electrolyte-facing surface formed by graphite or another material, compatible with the electrolyte. For example, the positive current collector may be a graphite foil or an aluminum foil comprising a graphite coating or another type of conductive coating that is stable to the electrolyte environment. The cell also comprises an electrolyte comprising an electrolyte salt and an electrolyte solvent. For example, the electrolyte salt comprises a zinc salt having a concentration of at least 30% by weight in the electrolyte.

The cell is fabricated by printing a positive active material layer over the positive current collector. In some examples, the electrolyte is printed directly over the positive active material layer, and this printed electrolyte may be referred to as an electrolyte layer. In the same or other examples, the electrolyte layer is printed on a negative electrode layer and/or on a separator layer (e.g., one or more both sides of the separator layer). It should be noted that in the assembled cell, all printed electrolyte layers redistribute, soak the separator layer, and provide ionic transport between the positive and negative electrodes. The original printed electrolyte layers may no longer be defined in the cell after its fabrication. Furthermore, in some examples, the electrolyte provides adhesion between adjacent layers (e.g., away from the cell edges). For example, the electrolyte provides adhesion between the separator layer and the positive electrode and, separately, between the separator layer and the negative electrode (with the separator layer being positioned between the positive and negative electrodes). This adhesion can be provided during the cell fabrication (e.g., to support different layers relative to each other) and during the cell operation (e.g., to ensure the ionic pathway between the positive and negative electrodes).

Returning to the cell fabrication sequence, a separator layer can be positioned over the positive electrode (e.g., with a printed electrolyte layer on the surface of the positive electrode facing the separator). In some examples, a double-sided tape surrounds the positive electrode or at least the positive active material layer of the positive electrode. In these examples, the separator layer can extend over the double-sided tape and the double-sided tape provides additional support to the separator layer during further fabrication operations. In some examples, a separator layer is printed.

A negative electrode is then laminated to the separator layer. As noted above, an electrolyte layer can be printed over the negative electrode (before the lamination) in addition to or instead of other electrolyte layers printed on other components. In some examples, two electrolyte layers (printed on different components) can be laminated together. In further examples, various components of the electrolyte are incorporated into the positive active material layer and/or the negative active material layer when printing these layers. For example, the electrolyte salt and/or the electrolyte solvent may be parts of the inks/slurries used to print one or both active material layers. Regardless of all the different methods of introducing the electrolyte into a cell, the electrolyte is redistributed (e.g., soaks a porous separator layer) and provides ionic conductivity between the positive and negative electrodes.

These and other examples are described further below with reference to the figures.

BRIEF DESCRIPTION OF THE DRAWINGS

FIG. 4B is a process flowchart illustrating different options of introducing an electrolyte into an electrochemical cell, in accordance with some examples.

DETAILED DESCRIPTION

Figure 1A:
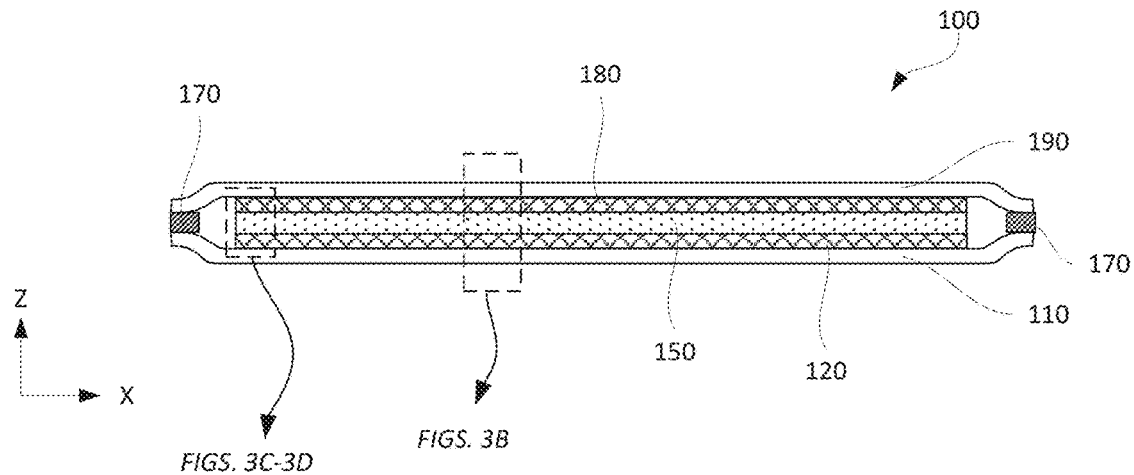
FIG. 1A is a schematic cross-sectional side view of an electrochemical cell in which both electrodes and the electrolyte are sealed between the two packaging layers, in accordance with some examples.

Various examples are described herein in the context of printable electrochemical cells with multivalent metal ions (e.g., $Zn^{2+}$) used for carrying the charge between the positive and negative electrodes in the cells. "Multivalent" is herein defined as an atomic or molecular species carrying more than one full charge. However, one having ordinary skills in the art will appreciate that some features apply to other types of electrochemical cells and/or other methods of manufacturing electrochemical cells. For example, conductive pressure-sensitive adhesive layers may be used in electrochemical cells with monovalent metal ions.

In this disclosure, the term "anode" refers to a negative electrode, which includes negative active material. The term "cathode" refers to a positive electrode, which includes positive active material. In other words, "anode" and "negative electrode" are used interchangeably regarding the operation state (e.g., charge or discharge) of the electrochemical cell. Likewise, "cathode" and "positive electrode" are used interchangeably regarding the operation state (e.g., charge or discharge) of the electrochemical cell.

Introduction

Using printing techniques to form various battery components, such as positive active materials layers, separator layers, and negative active material layers, as well as introducing electrolytes into printed batteries by way of temporary printed layers provide unique opportunities for battery design and for achieving specific performance characteristics of these batteries. For example, printing an active material layer on a current collector establishes a robust electro-mechanical connection between this active material layer and the current collector. Printing involves depositing a layer of ink onto a base, which may be a substrate or another printed layer. Similarly, printing an electrolyte layer over an active material layer establishes a robust ionic connection between these layers by reducing voids and gaps between these layers. Also, printing an electrolyte layer provides a unique way of introducing an electrolyte into batteries and can help with various fabrication operations (e.g., support and maintain alignment) and post-fabrication (e.g., providing uniform distribution of the electrolyte in the cell) as well as introduce sufficient amount of electrolytes into various types of cell packaging.

For purposes of this disclosure, the terms "ink" and "slurry" are used interchangeably. Depending on the type of a printed layer, the ink may contain various components, such as a binder, active material particles, conductive particles, fillers, salts, solvents, and the like. Specifically, when an active material layer is printed on a current collector, the ink establishes very conformal contact with the surface of the current collector. This conformality provides strong adhesion between the binder and the surface when the ink is dried. Furthermore, active material particles and/or conductive additives in the ink can get closer to the surface of the current collector and better electrical connection in comparison, for example, to lamination of a preformed active material layer onto the current collector.

Various printed components of an electrochemical cell are within the scope, such as a printed current collector (e.g., a fully printed current collector and/or a partially printed current collector such as printing a protective layer over a metal foil), a printed active material layer (e.g., over a current collector and/or over an electrolyte layer), and/or a printed separator layer (e.g., over an active material layer). A printed active material layer can be a positive active material layer, a negative active material layer, or both. Furthermore, an electrolyte layer can be printed, e.g., as a single layer or multiple layers (e.g., one printed on a positive active material layer and another printed over a separator and then laminated together during the stacking/laminating step).

Electrochemical Cell Examples

FIG. 1A is a schematic illustration of printed electrochemical cell 100, in accordance with some examples. Printed electrochemical cell 100 comprises positive electrode 120, negative electrode 180, and separator layer 150, which may be collectively referred to as an internal component. While not specifically shown in FIG. 1A, printed electrochemical cell 100 also comprises electrolyte 151, which soaks separator layer 150 and provides ionic communication between positive electrode 120 and negative electrode 180. In some examples, printed electrochemical cell 100 comprises multiple positive electrodes and/or multiple negative electrodes, e.g., forming a stack of alternating positive and negative electrodes. At least one of positive electrode 120, negative electrode 180, and separator layer 150 is printed as further described below with reference to FIGS. 4A and 4B. In some examples, two or all three of positive electrode 120, negative electrode 180, and separator layer 150 are printed. Furthermore, electrolyte 151 can be also introduced into printed electrochemical cell 100 as a temporary printed layer (e.g., on positive electrode 120, negative electrode 180, and/or separator layer 150), followed by redistribution of electrolyte 151 after positive electrode 120, negative electrode 180, and separator layer 150 are laminated together.

Printed electrochemical cell 100 also comprises first packaging layer 110 and/or second packaging layer 190, which enclose and protect the internal component of printed electrochemical cell 100 from the environment. Furthermore, first packaging layer 110 and second packaging layer 190 may mechanically support the internal components of printed electrochemical cell 100. In some examples, first packaging layer 110 is laminated to positive current collector 125. In the same or other examples, while second packaging layer 190 is laminated to negative current collector 185. The lamination provides the adhesion between the corresponding packaging layer and the current collector and is used, e.g., to support the current collector during various fabrication operations such, as printing of active material layers, lamination, and even during the cell operation after its operation.

First packaging layer 110 and/or second packaging layer 190 may be flexible (e.g., able to bend) and conform to the stack formed by positive electrode 120, electrolyte 151, and negative electrode 180. First packaging layer 110 and/or second packaging layer 190 may be formed from paper (e.g., cardstock or different types/weaves/thicknesses of paper), polymeric or plastic materials (e.g., polyethylene terephthalate or polyester (PET), polyethylene, polypropylene, Kapton, polyimide, polyester ether ketone (PEEK), polyurethane, polydimethysiloxane or other silicone resins), fabric of various weaves and meshes (e.g. nylon, cotton, denim) silicon, printed circuit board (e.g. cured epoxy resin substrates, FR4, and flexible circuit boards), glass, metal foil, or combination thereof (e.g. fabric with plastic backing). In some examples, at least one of first packaging layer 110 or second packaging layer 190 comprises a microprocessor or a MEMS device. At least one of first packaging layer 110 or second packaging layer 190 may include adhesive backing for attaching to other components. For example, the adhesive backing may be in the form of a pressure-sensitive adhesive temporarily covered with a removable liner.

Figure 1B:
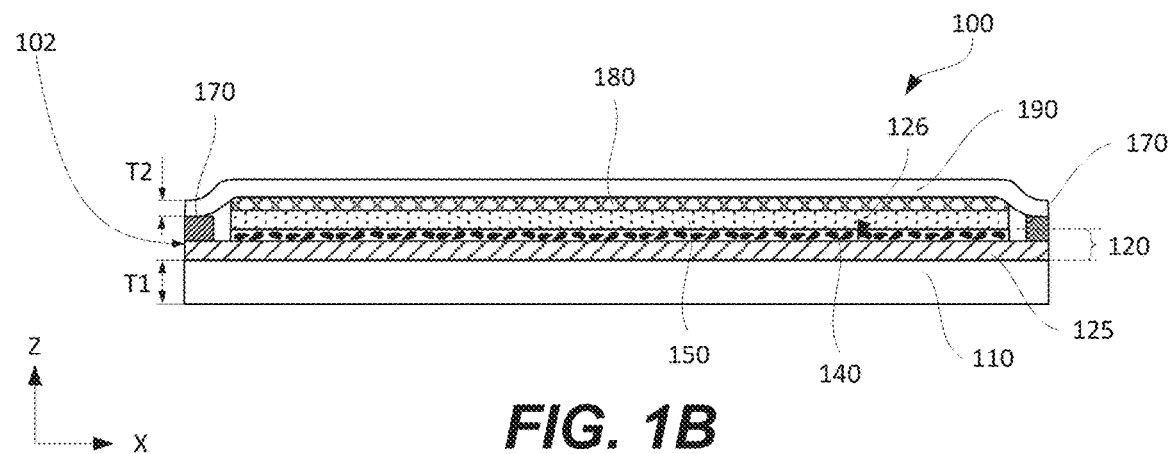
FIG. 1B is a schematic cross-sectional side view of an electrochemical cell in which one current collector extends to the edge of the cell, in accordance with some examples.

In some examples, first packaging layer 110 and second packaging layer 190 are made from the same materials. Alternatively, first packaging layer 110 and second packaging layer 190 are made from different materials. As described above, at least one of first packaging layer 110 and second packaging layer 190 may be shared with other external components, such as another battery, an electronic component to which printed electrochemical cell 100 is connected, and the like. Furthermore, one packaging layer may be selected to be more conformal than the other layer to ensure that the all internal components of printed electrochemical cell 100 are constrained between first packaging layer 110 and second packaging layer 190. Referring to FIG. 1B, in some examples, one packaging layer is thicker than the other packaging layer, e.g., at least 1.5 times, at least 2 times, or at least 3 times.

First packaging layer 110 and second packaging layer 190 are sealed relative to each other (e.g., around the entire cell perimeter), thereby isolating internal components of printed electrochemical cell 100 from the environment as, e.g., shown in FIG. 1A. A double-sided adhesive tape or a direct sealing (e.g., welding technique) may be used for this purpose. Alternatively, one or more components, e.g., a positive current collector and/or a negative current collector may extend to the edge of the battery and be exposed (at least at this edge) as will now be described with reference to FIG. 1B.

FIG. 1B illustrates an example in which second packaging layer 190 is adhered to positive current collector 125 using double-sided adhesive tape 170. Double-sided adhesive tape 170 is used because of the different materials (e.g., polymer and graphite) of these adhered components, which makes any direct bonding difficult. Furthermore, double-sided adhesive tape 170 provides other benefits and functions during the fabrication of printed electrochemical cell 100 as further described below. For example, double-sided adhesive tape 170 can be used to support internal components (e.g., separator layer 150) during cell fabrication and operation.

Figure 1C:
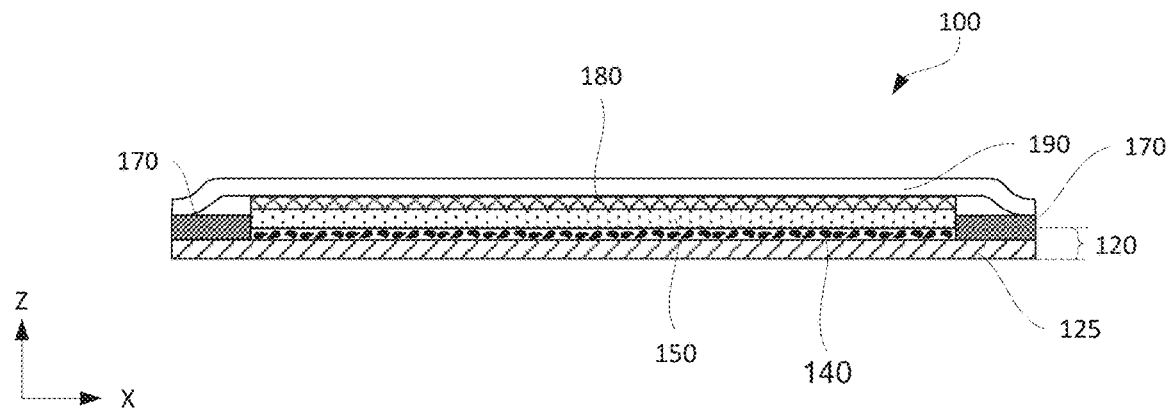
FIG. 1C is a schematic cross-sectional side view of an electrochemical cell in which a side of one current collector is exposed, in accordance with some examples.
Figure 1D:
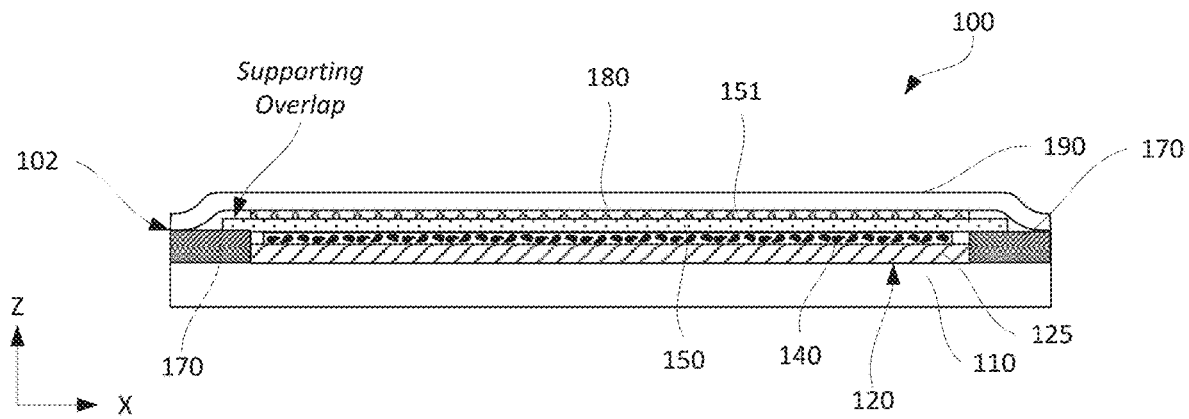
FIGS. 1D and 1E are schematic cross-sectional side views of two additional examples of an electrochemical cell, in accordance with some examples.

Referring to FIG. 1D, separator layer 150 overlaps with double-sided adhesive tape 170 to support separator layer 150. It should be noted that separator layer 150 only overlaps with a portion of double-sided adhesive tape 170 and does not extend to the cell edge. Also, in this example, current collectors do not extend to cell edge 102. In other words, cell edge 102 is formed by first packaging layer 110, double-sided adhesive tape 170, and second packaging layer 190.

In some examples, double-sided adhesive tape 170 comprises a carrier film and two adhesive layers on each side of the carrier film. The carrier film prevents electrical shorts between various components of the battery, such as positive current collector 125 and negative current collector 185. In some examples, the carrier film is a plastic film (e.g., polyester, polypropylene, and polyethylene) or any other suitable materials (e.g., paper, nonwoven fabric). The carrier film can be from 10 micrometers to 300 micrometers thick or, more specifically, from 20 micrometers to 200 micrometers thick. Each adhesive layer can be an acrylic adhesive, a rubber adhesive, or a silicone adhesive. The type and thickness of the carrier film and the nature of the adhesive layers can influence the battery characteristics in at least two of the following ways.

First, a thicker double-sided adhesive tape 170 or, more specifically, double-sided adhesive tape 170 with a thicker carrier is easier to handle and process, e.g., to form patterns, punch holes, and laminate. A thicker carrier provides greater mechanical stability to the overall structure. As an example, a 250-micron tape with a 50-micron PET carrier film is easier to process than a 250-micron tape with a 10-micron PET carrier film. Second, during printing of an active layer (of a positive electrode, a negative electrode, or an electrolyte), double-sided adhesive tape 170 determines the depth of the opening formed/surrounded by double-sided adhesive tape 170. This depth, in turn, translates into the thickness of the active layer, e.g., when a stencil is used over the surface of double-sided adhesive tape 170. As an example, printing a positive active material slurry (comprising manganese dioxide) into an opening formed by double-sided adhesive tape 170 that is 125-micrometer thick and comprises a 50-micrometer thick release liner with a 100-micrometer stencil, results, after drying, in a positive active material layer that has a thickness from 140 micrometers to 160 micrometers. On the other hand, printing the same slurry into an opening formed by double-sided adhesive tape 170 that is 250-micrometer thick and also comprises a 50-micrometer thick release liner with the same stencil, results, after drying, in a positive active material layer that is more than 200-micrometer thick. It should be noted that the stencil thickness is generally limited due to the ink nature and post-printing processing.

In some applications, such as smart labels, thicker positive and negative electrodes are used to provide higher material loadings, which result in higher battery capacities per unit surface area. For example, achieving 100 mAh or greater capacity in a cell that has a footprint of 30 millimeters by 130 millimeters, double-sided adhesive tape 170 may have a thickness of more than 125 micrometers. On the other hand, for applications requiring higher flexibility and lower overall thickness, double-sided adhesive tape 170 with smaller thicknesses (e.g., less than 125 micrometers, less than 100 micrometers, or less than 75 micrometers) can be used.

Figure 1E:
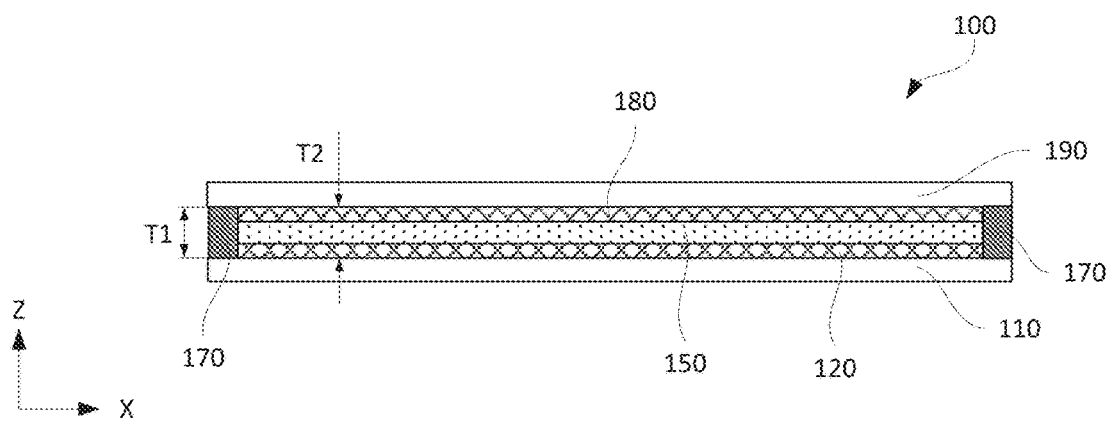

Furthermore, referring to FIG. 1E, the thickness of double-sided adhesive tape 170 determines how much flexibility is needed from first packaging layer 110 and second packaging layer 190 when forming a seal at cell edge 102. For example, only double-sided adhesive tape 170 can be positioned between first packaging layer 110 and second packaging layer 190 at cell edge 102 while, away from cell edge 102, the stack positioned between first packaging layer 110 and second packaging layer 190 comprises positive electrode 120, separator layer 150, and negative electrode 180. In some examples, double-sided adhesive tape 170 has a thickness of within 50% or, more specifically, within 25% or even within 15% of the combined thickness of the positive electrode 120, separator layer 150, and negative electrode 180. As such, minimum to no bending is needed first packaging layer 110 and second packaging layer 190 to conform to all internal cell components (i.e., transitioning away from cell edge 102). In other examples, only double-sided adhesive tape 170 is positioned between positive current collector 125 and negative current collector 185. In these examples, double-sided adhesive tape 170 has a thickness of within 50% or, more specifically, within 25% or even within 15% of the combined thickness of positive active material layer 140, separator layer 150, and negative active material layer 160. In further examples, only double-sided adhesive tape 170 is positioned between positive current collector 125 and second packaging layer 190. In these examples, double-sided adhesive tape 170 has a thickness of within 50% or, more specifically, within 25% or even within 15% of the combined thickness of positive active material layer 140, separator layer 150, and negative electrode 180. Finally, in some examples, only double-sided adhesive tape 170 is positioned between first packaging layer 110 and negative current collector 185. In these examples, double-sided adhesive tape 170 has a thickness of within 50% or, more specifically, within 25% or even within 15% of the combined thickness of positive electrode 120, separator layer 150, and negative active material layer 160.

The adhesive layers of double-sided adhesive tape 170 are important to ensure good adhesion to both components, one on each side of double-sided adhesive tape 170. For example, FIG. 1B illustrates double-sided adhesive tape 170 is used to bond positive current collector 125 to second packaging layer 190. In some examples, double-sided adhesive tape 170 is used to bond positive current collector 125 to negative current collector 185, negative current collector 185 to first packaging layer 110, and/or first packaging layer 110 to second packaging layer 190. It should be noted that some adhesives are more chemically inert than others, which is an important consideration as double-sided adhesive tape 170 comes in contact with various electrolyte components and electrode components. As an example, rubber pressure-sensitive adhesives (PSA) provide good adhesion to copper and may be used in combination with a copper current collector (e.g., negative current collector 185). Acrylic PSAs have strong adhesion to aluminum and graphite and may be used in combination with graphite or aluminum current collectors (e.g., positive current collector 125). In some examples, double-sided adhesive tape 170 has different adhesives on different sides, e.g., one facing a positive current collector and one facing a negative current collector.

In some examples, double-sided adhesive tape 170 surrounds negative electrode 180, electrolyte 151, and at least positive active material layer 140 of positive electrode 120. Double-sided adhesive tape 170 is sealably attached to at least second packaging layer 190. In more specific examples, double-sided adhesive tape 170 is sealably attached to at least second packaging layer 190 and to electrolyte-facing surface 126 of positive current collector 125.

In some examples, double-sided adhesive tape 170 has a thickness of within 50% (+/−50%) or, more specifically, within 25% (+/−25%) of the total thickness of positive active material layer 140, electrolyte 151, and negative electrode 180. This thickness correspondence ensures the flatness of first packaging layer 110 and/or second packaging layer 190 around the battery edge. In other words, double-sided adhesive tape 170 operates as a leveling component to accommodate the stack thickness between packaging layers, between a packaging layer and a current collector, or even between two current collectors.

Referring to the example in FIG. 1B, a portion of positive electrode 120 (e.g., positive current collector 125) also extends to cell edge 102 and is a part of the perimeter seal of printed electrochemical cell 100. This feature may be used, e.g., for letting the gasses escape from printed electrochemical cell 100. For example, at least a portion of positive current collector 125 comprises graphite or another porous material which allows gases to escape from printed electrochemical cell 100. Referring to FIG. 1B, in this example, positive current collector 125 is laminated to first packaging layer 110, while double-sided adhesive tape 170 is positioned between and adhered to both positive current collector 125 and second packaging layer 190.

In some examples, first packaging layer 110 and/or second packaging layer 190 are shared with other devices, such as another electrochemical cell, sensor, antenna, charging circuitry, and the like. The electronic components such as conductive trays, antennas, or sensors can be printed directly on the packaging. When multiple electrochemical cells share the same substrate, these cells may be interconnected in series, parallel, or a combination of two methods. In some examples, multiple electrochemical cells may be stacked along the Z-axis, such that second packaging layer 190 is shared by two electrochemical cells, as a top packaging layer in one cell and as a bottom packaging layer in another cell.

In some examples, printed electrochemical cell 100 comprises only one packaging layer, e.g., second packaging layer 190 shown in FIG. 1C. In these examples, positive current collector 125 is exposed and may be used to form direct electrical connections to positive current collector 125. In some examples, positive current collector 125 is a part of another device (e.g., a conductive line in a printed circuit board), and printed electrochemical cell 100 is formed over and directly integrated with this other device.

Figure 2A:
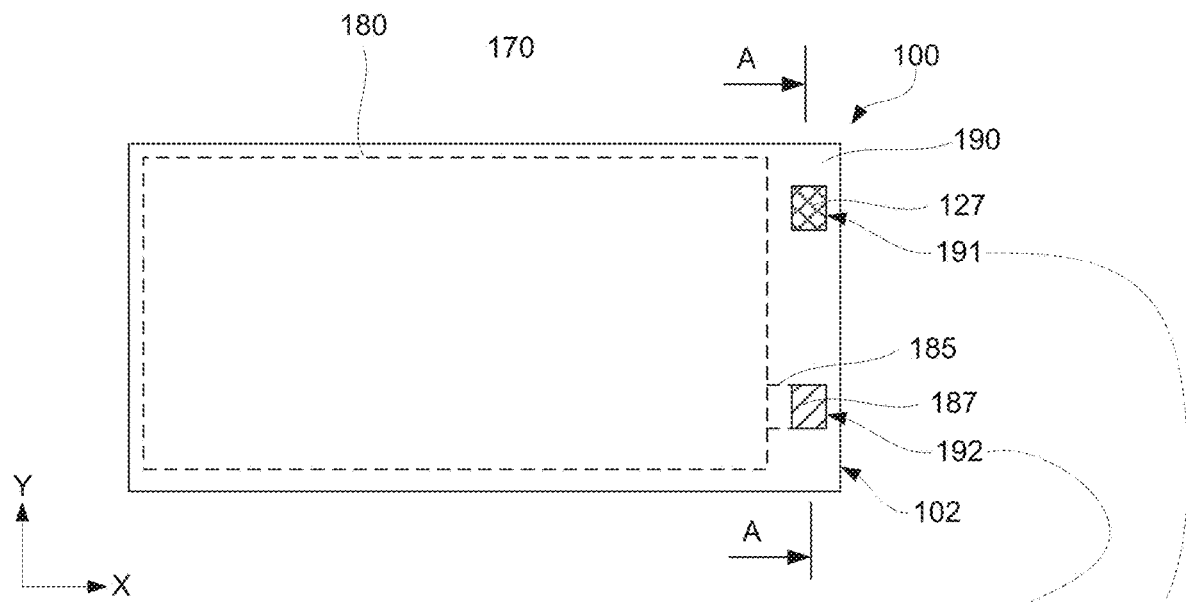
FIG. 2A is a schematic top view of an electrochemical cell, showing external contacts to the electrochemical cell formed through a packaging layer, in accordance with some examples.

In some examples, electrical connections to printed electrochemical cell 100 are formed through second packaging layer 190. For example, FIG. 2A is a schematic top view of printed electrochemical cell 100, showing external contacts, e.g., positive contact 127 and negative contact 187. These contacts are accessible through openings in second packaging layer 190, such as positive contact opening 191 and negative contact opening 192. It should be noted that positive contact opening 191 also extends through double-sided adhesive tape 170, which is positioned between positive current collector 125 and second packaging layer 190. In other words, positive contact 127 is formed by a portion of positive current collector 125 exposed within positive contact opening 191. In this example, positive current collector 125 extends to cell edge 102. Furthermore, it should be also noted that negative contact 187 is formed by a portion of negative current collector 185, extending outside of the boundary of negative active material layer 160. In other words, this portion of negative current collector 185 is free from negative active material layer 160. This portion of negative current collector 185 is electrically isolated from positive current collector 125 by double-sided adhesive tape 170, e.g., double-sided adhesive tape 170 is disposed between negative current collector 185 and positive current collector 125 as shown in the left portion of FIG. 2B. At least a part of this portion of negative current collector 185 is exposed within negative contact opening 192, forming negative contact 187.

Figure 2B:
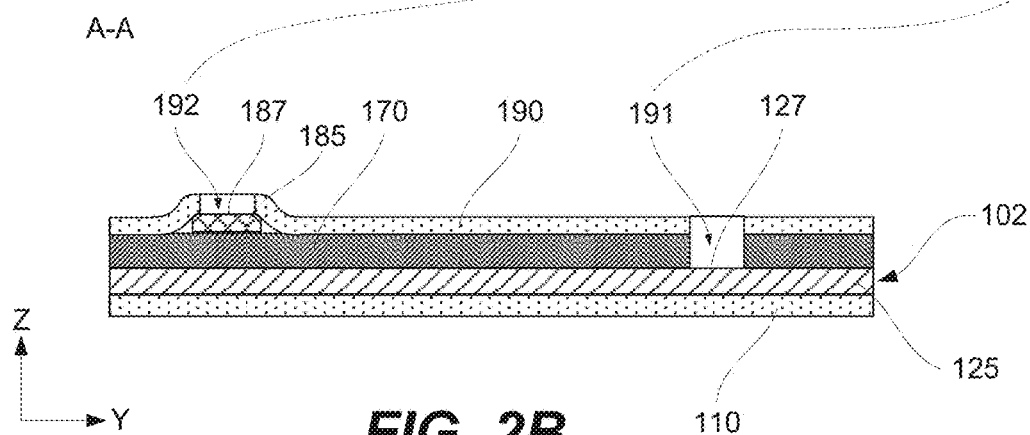
FIG. 2B is a schematic cross-sectional side view of the electrochemical cell in FIG. 2A showing external contacts, in accordance with some examples.
Figure 2C:
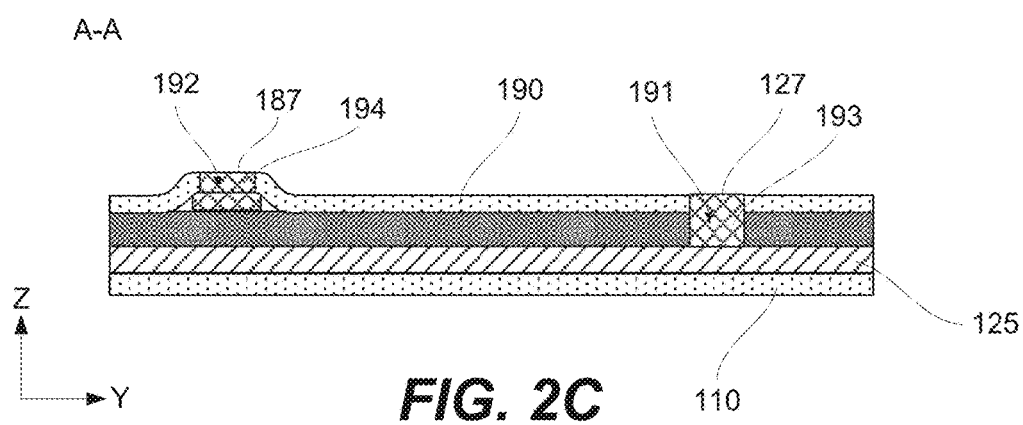
FIG. 2C is a schematic cross-sectional side view of another example of the electrochemical cell, showing external contacts, in accordance with some examples.

FIG. 2C is a schematic cross-sectional side view of another example of printed electrochemical cell 100. In this example, positive contact opening 191 and negative contact opening 192 are filled with corresponding structures such that the top surfaces of positive contact 127 and negative contact 187 are coplanar with the external surface of second packaging layer 190. In other examples (not shown), the top surfaces of positive contact 127 and negative contact 187 extend above/away from the external surface of second packaging layer 190. For example, printed electrochemical cell 100 comprises positive via 193, disposed within positive contact opening 191 and forming positive contact 127. Printed electrochemical cell 100 also comprises negative via 194, disposed within negative contact opening 192 and forming negative contact 187.

Figure 2D:
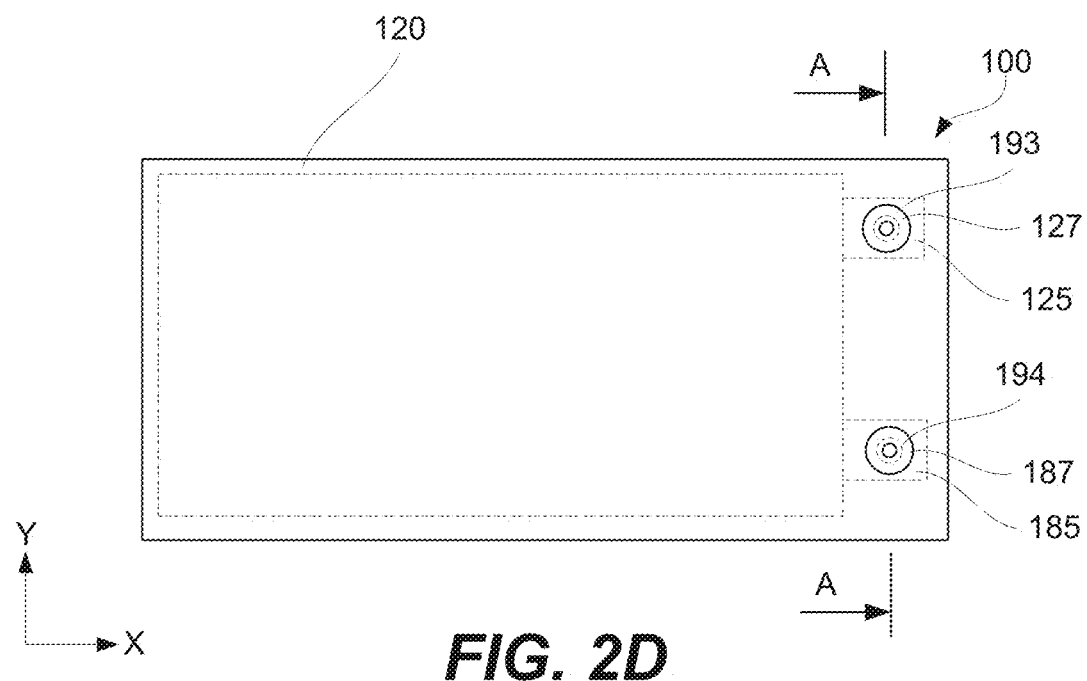
FIGS. 2D-2F are schematic views of an electrochemical cell using eyelets to form electrical connections to respective current collectors, in accordance with some examples.
Figure 2E:
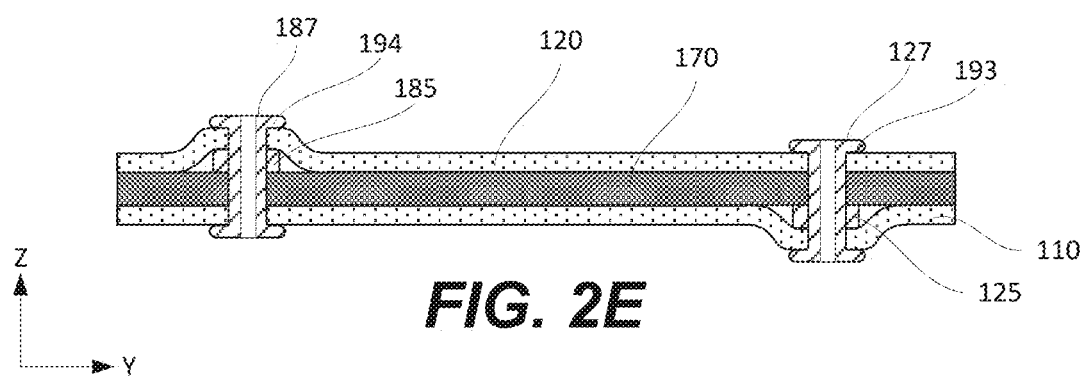
Figure 2F:
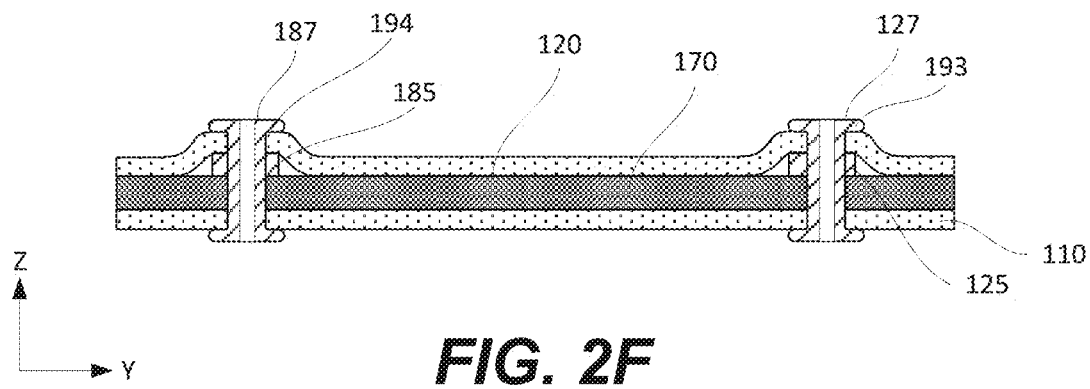

FIGS. 2D-2F are schematic views of additional examples of printed electrochemical cell 100 in which positive via 193 and negative via 194 are formed by double-headed eyelets. Specifically, each eyelet protrudes through first packaging layer 110 and second packaging layer 190 (as well as through a corresponding current collector) and compresses the first packaging layer 110 and second packaging layer 190. As such, not only the eyelet forms an electrical connection with the corresponding current collector and provides an option for making an electrical connection on both sides of printed electrochemical cell 100, but the eyelet also helps to maintain the seal between first packaging layer 110 and second packaging layer 190. One additional benefit of an eyelet is associated with an opening protruding through the eyelet. Specifically, an external electrical connection can be formed by protruding a part of an external connector into this opening. An eyelet cane can be formed using a single metal component (e.g., initially having a single head and a stem and by forming a second head) or using two components (e.g., each having a head and partial steam by joining these stems together).

Figure 2G:
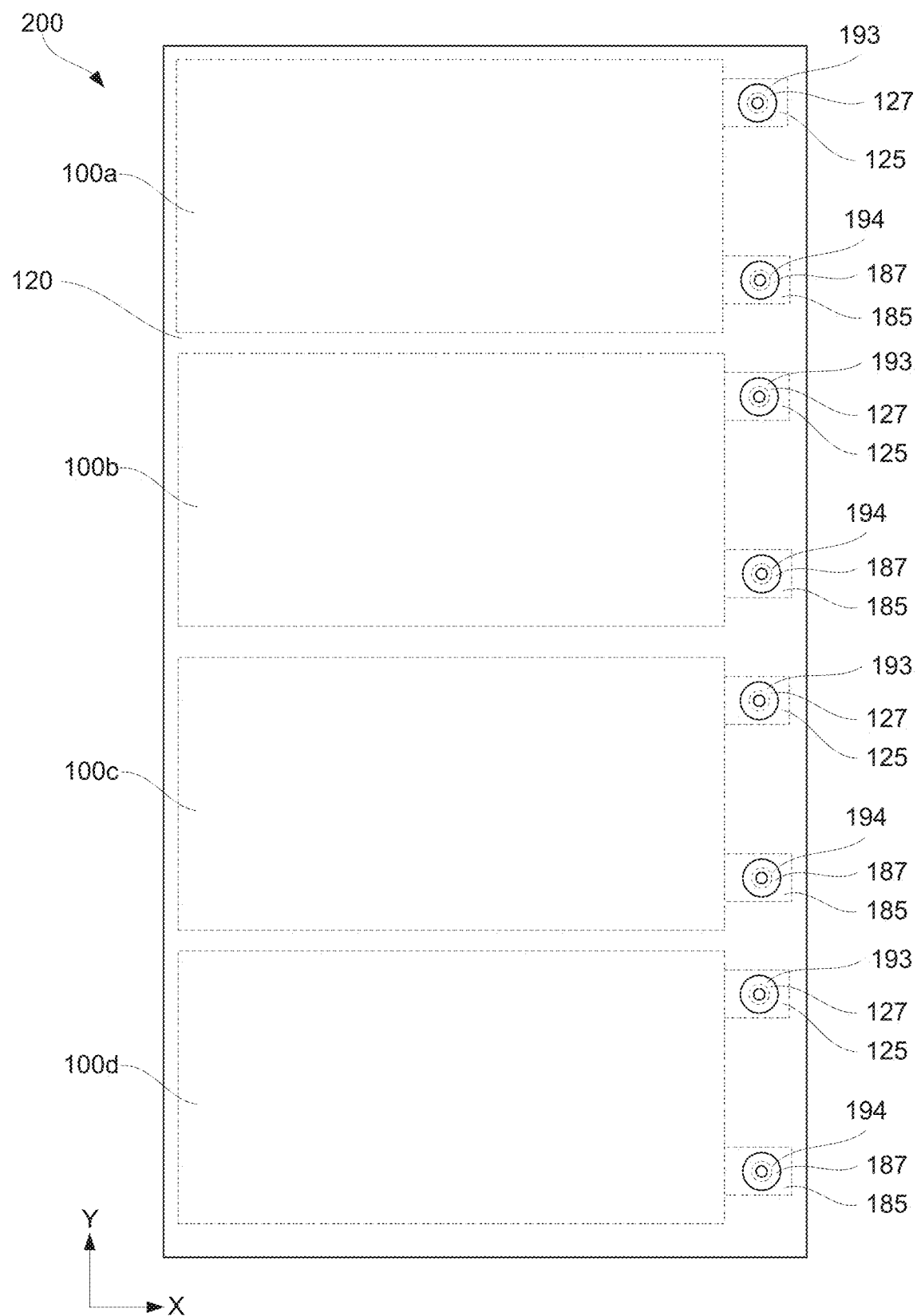
FIG. 2G is a schematic top view of an assembly of multiple electrochemical cells sharing first and second packaging layers, in accordance with some examples.

FIG. 2G is a schematic top view of assembly 200 of multiple electrochemical cells 100a-100d sharing first and second packaging layers, in accordance with some examples. The shared packaging layers provide direct mechanical integration of electrochemical cells 100a-100d. Furthermore, multiple electrochemical cells 100a-100d can be interconnected in series and/or parallel within assembly 200 to achieve the desired voltage and/or current characteristics.

Positive Electrode Examples

Figure 3A:
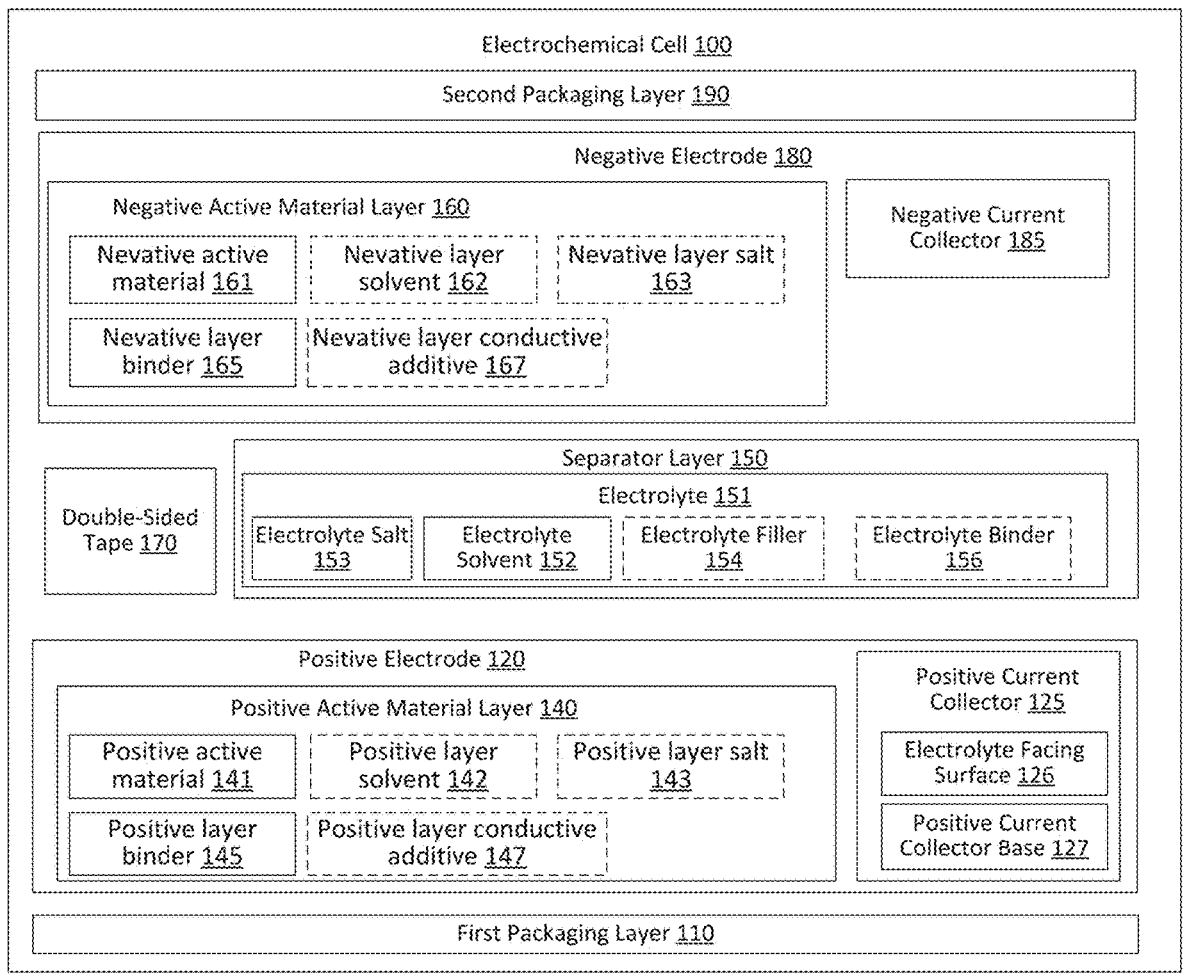
FIG. 3A is a schematic block diagram illustrating various components of an electrochemical cell, in accordance with some examples.
Figure 3B:
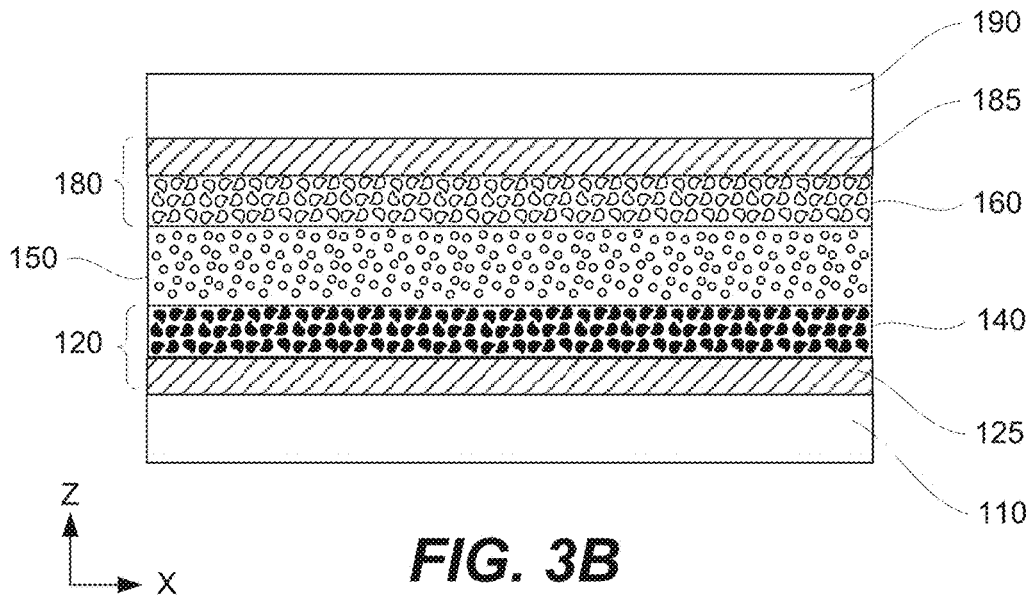
FIGS. 3B-3D are schematic cross-sectional side views of different portions of an electrochemical cell, in accordance with some examples.
Figure 3C:
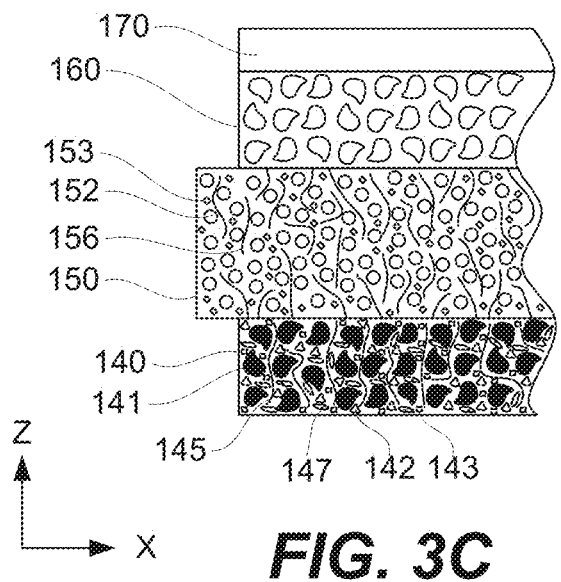
Figure 3D:
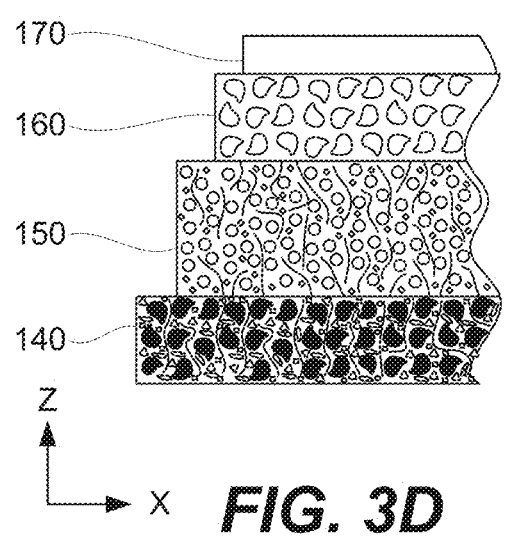

Referring to FIGS. 3A and 3B, positive electrode 120 comprises positive current collector 125 and positive active material layer 140. In some examples, positive active material layer 140 is printed over positive current collector 125. Positive current collector 125 provides electronic conductivity between positive active material layer 140 and positive contact 127. In some examples, a portion of positive current collector 125, which is free from positive active material layer 140 and which extends outside of the boundary of first packaging layer 110 and second packaging layer 190, is operable as positive contact 127. In more specific examples, positive current collector 125 extends to one or all edges of printed electrochemical cell 100. For example, positive current collector 125 is a graphite foil, which cannot be easily patterned or shaped.

In some examples, positive current collector 125 has a two-dimensional (2D) shape. For purposes of this disclosure, the 2D shape is defined as a shape in which one dimension (e.g., thickness) is at least 10 times less than either one of the remaining dimensions (e.g., length and width). The 2D shape of positive current collector 125 allows forming printed electrochemical cell 100 with a flat profile (e.g., thin), unlike cylindrical cells. Furthermore, this shape enhances the flexibility of printed electrochemical cell 100. This feature distinguishes printed electrochemical cell 100 from conventional zin chloride batteries in which positive current collectors are in the form of rods (i.e., having a one-dimensional (1D) shape) producing cylindrical cells.

In some examples, positive current collector 125 comprises electrolyte-facing surface 126 formed by graphite or any other conductive material capable of withstanding the electrolyte environment. Unlike metals, graphite is electrochemically resistant to many types of electrolytes and battery operating conditions (e.g., positive electrode voltages). A graphite-based electrolyte-facing surface can be formed by depositing a graphite layer over a metal foil or by using a graphite-based current collector (e.g., graphite forming the entire volume of positive current collector 125). One example of a graphite-based current collector is a graphite foil.

Graphite foil also has an advantage over printed conductive carbon inks in terms of conductivity. Graphite foil has a surface resistivity of 0.01-0.1 Ohm per square in the thickness range of 10 micrometers to 100 micrometers. For comparison, graphite foil has a resistance that is 10 times to 1000 times lower than the resistance of conductive carbon inks. The higher carbon content and the lower resistance give graphite foil many advantages in battery applications, e.g., where high power pulses are required such as pulses of 1-100 mA per square cm of the battery surface. One example of graphite foil is natural graphite foil made from natural graphite, by exfoliation of graphite in sulfuric acid. Another example is an artificial graphite foil, made by pyrolysis of a polymer. Natural graphite foil typically has a higher resistance than artificial graphite foil. In some examples, the percent of the carbon in graphite foil is above 98% by weight.

Overall, electrolyte-facing surface 126 may be a part of a bulk structure, e.g., positive current collector 125 is a graphite foil. Alternatively, a portion of positive current collector 125 may be a metal foil (e.g., formed from, or at least comprises, one or more of nickel, stainless steel, regular steel, titanium, and aluminum). In these examples, electrolyte-facing surface 126 is formed by a graphite coating disposed on at least one side of the metal foil. In some examples, the metal foil has a thickness of between 1 micrometer and 80 micrometers or, more specifically, between 5 micrometers and 30 micrometers. In a specific example, positive current collector 125 with an aluminum foil with a pin-hole-free graphite coating. In some examples, a pin-hole-free graphite coating is formed by directly coating a conductive ink onto a base foil. In this case, ink (comprising a solvent, graphite, and polymer) is coated on a foil. Some examples of suitable polymers include polyethylene, isobutylene, and polyvinyl chloride (PVC). To achieve, a non-porous pin-hole-free structure, a conductive film can be from 5 micrometers to 200 micrometers thick or, more specifically, from 10 micrometers to 100 micrometers thick. In some examples, a base metal current collector is protected from corrosion by laminating a pre-made conductive film onto the base metal current collector (e.g., a metal foil). The base metal current collector optionally has a conductive coating with a thickness from 0.5 micrometers to 5 micrometers. The conductive coating improves the adhesion of the laminated film and provides additional protection and conductivity.

In some examples, positive active material layer 140 comprises positive active material 141 and positive layer binder 145 as schematically shown in FIG. 3A. In some examples, positive active material 141 comprises or consists essentially of Some examples of positive active material 141 include, but are not limited to, manganese oxide ($MnO_2$), nickel oxide ($NiO_2$), vanadium oxide ($V_2O_5$), ferric phosphate ($FePO_4$), cobalt oxide ($CoO_2$), lead oxide (PbO), and chromium oxide ($Cr_2O_3$). Positive active material 141 may be in the form of particles, having a mean particle size of between about 1 micrometer and 100 micrometers.

In some examples, positive layer binder 145 is hydrophilic, such as polyacrylic latex (LA132), carboxyl methylcellulose (CMC), other cellulose derivatives and xanthan gum, chitosan, polyvinyl alcohol (PVA), or polyvinyl chloride (PVC). In some examples, the concentration of a binder is between 1% and 20% by weight, or more specifically between 2% and 5%. The selection of positive layer binder 145 is controlled, in part, by the ink deposition process, e.g., screen-printing or stencil printing and a substrate.

In some examples, positive active material layer 140 further comprises conductive additive 147, as schematically shown in FIG. 3A. Some examples of conductive additive 147 include, but are not limited to, conductive carbons (e.g., carbon black, graphite, carbon nanotubes, graphene), or conductive nanoparticles (e.g., metal nanoparticles). The amount of conductive additive 147 may be between 0.01% and 30% by weight or, more specifically, between 2% and 5% for carbon black and graphite and/or between 0.01% and 2% for carbon nanotubes and graphene.

In some examples, positive active material layer 140 further comprises positive layer solvent 142, as schematically shown in FIG. 3A. When present, positive layer solvent 142 may be the same as or different from electrolyte solvent 152, schematically shown in FIG. 3A and various examples of which are described below. In some examples, positive layer solvent 142 comprises water. In some examples, the water is fully or partially remains in the positive layer. In some examples, positive layer solvent 142 comprises a solvent such as trimethyl phosphate (TMP), triethyl phosphate (TEP), N-methyl pyrrolidone (NMP), acetophenone, tetramethyl urea.

In some examples, positive active material layer 140 further comprises positive layer salt 143, as schematically shown in FIG. 2B. Positive layer salt 143 may be a zinc-containing salt, such as zinc chloride, $Zn(FSI)_2$, $Zn(TFSI)_2$. Positive layer salt 143 may also comprise other salts such as ammonium chloride. Positive layer salt 143 may be introduced into positive active material layer 140 during printing of positive active material layer 140 on positive current collector 125. In some examples, positive layer salt 143 is different from electrolyte salt 153.

Electrolyte Examples

Referring to FIG. 3A, electrolyte 151 provides ionic communication between negative electrode 180 and positive electrode 120 or, more specifically, between negative active material layer 160 and positive active material layer 140. For example, electrolyte 151 facilitates the transmission of multivalent ions, such as zinc, between negative active material layer 160 and positive active material layer 140.

Referring to FIG. 3A, in some examples, electrolyte 151 comprises electrolyte solvent 152 and electrolyte salt 153. When electrolyte 151 is printed (e.g., as a standalone layer), electrolyte 151 can also comprise electrolyte binder 156.

Electrolyte binder 156 mechanically supports other components in electrolyte 151 relative to each other. Furthermore, electrolyte binder 156 supports electrolyte 151 relative to other components, e.g., when electrolyte 151 is printed over negative active material layer 160 or over positive active material layer 140. Some examples of electrolyte binder 156 include, but are not limited to, polyacrylic latex (LA132), carboxyl methylcellulose (CMC), and other cellulose derivatives and xanthan gum, chitosan, or polyvinyl alcohol (PVA).

In some examples, electrolyte 151 is supported within separator layer 150, which can be a porous polymer. For example, separator layer 150 can be initially provided free from solvents and salts. Once the porous polymer separator is positioned between positive electrode 120 and negative electrode 180, electrolyte 151 is transferred into separator layer 150 and soak separator layer 150. For example, one or more temporary electrolyte layers can be printed on positive electrode 120 and/or negative electrode 180. In some examples, one or more temporary electrolyte layers can be printed on separator layer 150.

Electrolyte solvent 152 provides for ionically conductive media of electrolyte 151. In some examples, electrolyte solvent 152 comprises one or more of water and low-melting solvents, such as diethyleneglycol-dimethyleter (diglime), triethyleneglycol (triglime), and polyethylene glycol or polypropylene glycol with molecular weight less than 1000.

In some examples, electrolyte solvent 152 is the same as positive layer solvent 142. Alternatively, electrolyte solvent 152 is different from positive layer solvent 142.

Electrolyte salt 153 is an ionic source within electrolyte 151. Positive layer salt 143 and/or negative layer salt 163 are other ionic sources in the overall system. Electrolyte salt 153 may be uniformly distributed throughout electrolyte 151, at least during fabrication of electrolyte 151. In some examples, electrolyte salt 153 comprises one or more of zinc chloride ($ZnCl_2$), ammonium chloride ($NH_4Cl$), zinc sulfate, and zinc triflate, $Zn(BF_4)_2$, zinc acetate. Electrolyte salt 153 may also comprise ammonium chloride. It should be noted that zinc chloride, and chlorides in general, are highly corrosive, e.g., to positive current collector 125. As such, positive current collector 125 is formed from graphite or at least comprises electrolyte-facing surface 126 formed by the graphite.

The solubility limit of electrolyte salt 153 within electrolyte solvent 152 is defined as the concentration of electrolyte salt 153 added to electrolyte solvent 152 at which no more electrolyte salt 153 can be dissolved. In some examples, the concentration of electrolyte salt 153 is at least 30% by weight (based on the total weight of electrolyte 151) or even at least about 50% by weight.

In some examples, electrolyte 151 (e.g., a printed electrolyte that is also operable as separator layer 150) also comprises electrolyte filler 154, such as silica, titania, or zinc oxide. The presence of the small particle size filler is beneficial for the electrolyte printing process, as the filler increases the electrolyte viscosity and the thixotropic properties of electrolyte 151. In some examples, is electrolyte 151 printed on the positive electrode and the negative electrode. In other examples, electrolyte 151 is printed only on the positive electrode or only on the negative electrode. As one example, if the positive electrode comprises water and salt, then electrolyte 151 is oriented only on the negative electrode.

Negative Electrode Examples

Referring to FIGS. 3A and 3B, negative electrode 180 comprises negative current collector 185 and negative active material layer 160. In some examples, negative current collector 185 and negative active material layer 160 are the same component, e.g., a zinc foil. Alternatively, negative current collector 185 and negative active material layer 160 are separate components, and zinc is provided into negative active material layer 160 in a powder form. In this latter case, the zinc surface area is larger thereby supporting a larger current density (current per electrode unit area). However, a larger surface area is also more susceptible to oxidation thereby reducing the electrode shelf life.

Negative current collector 185 provides electronic conductivity between negative active material layer 160 and negative contact 187. In some examples, a portion of negative current collector 185, free from negative active material layer 160 and exposed (e.g., through an opening in a packaging layer or extending outside of the boundary of the packaging layer) is operable as negative contact 187. In some examples, negative current collector 185 is a metal foil or a metal screen having a thickness of between 1 micrometer and 80 micrometers or, more specifically, between 5 micrometers and 30 micrometers. Thinner structures provide more flexibility, but less structural integrity and electronic conductivity. In some examples, negative current collector 185 is formed from, or at least comprises, one or more of copper (e.g., copper alloy), brass, steel or stainless steel, copper, and zinc. In other examples, negative current collector 185 is a printed layer, comprising a polymer binder and a conductive additive. Some examples of the conductive additive used for a printed example of negative current collector 185 include, but are not limited to, silver, brass, indium, carbon, nickel, and copper. An example of negative current collector 185 may be formed using one or more of inkjet printing, screen printing, stencil printing, flexographic printing, and/or slot die coating.

In some examples, negative active material layer 160 is printed over separator layer 150. Negative active material layer 160 comprises or consists essentially (e.g., at least 95% by weight or even at least 99% by weight) of negative active material 16:1. In some examples, negative active material 161 is an elemental metal, such as zinc. For example, zinc metal forms zinc ions of divalent charge ($Zn^{2+}$). In some examples, negative active material layer 160 comprises structures having multiple different morphological features (e.g., zinc flakes and spherical particles and nanoparticles) to increase electrode capacity and rate of discharge.

In some examples, negative active material layer 160 also comprises negative layer binder 165. In the same or other examples, negative active material layer 160 also comprises negative conductive additive 167. The conductive additive may be a carbon material (e.g., carbon black, graphite, nanotubes, graphene) or a metal. For example, metals with low overvoltage of hydrogen evolution may be used to minimize side reactions. Some examples include indium, bismuth, brass, lead, and mercury. In some examples, negative active material layer 160 also comprises negative layer salt 163 and/or negative active material layer 160 also comprises negative layer solvent 162. For example, negative layer salt 163 and negative layer solvent 162 may be used to form ("fill") electrolyte 151 after laminating negative electrode 180 to electrolyte 151. Specifically, after this lamination, negative layer salt 163 and negative layer solvent 162 are at least partially transfer into electrolyte 151.

Processing Examples

Figure 4A:
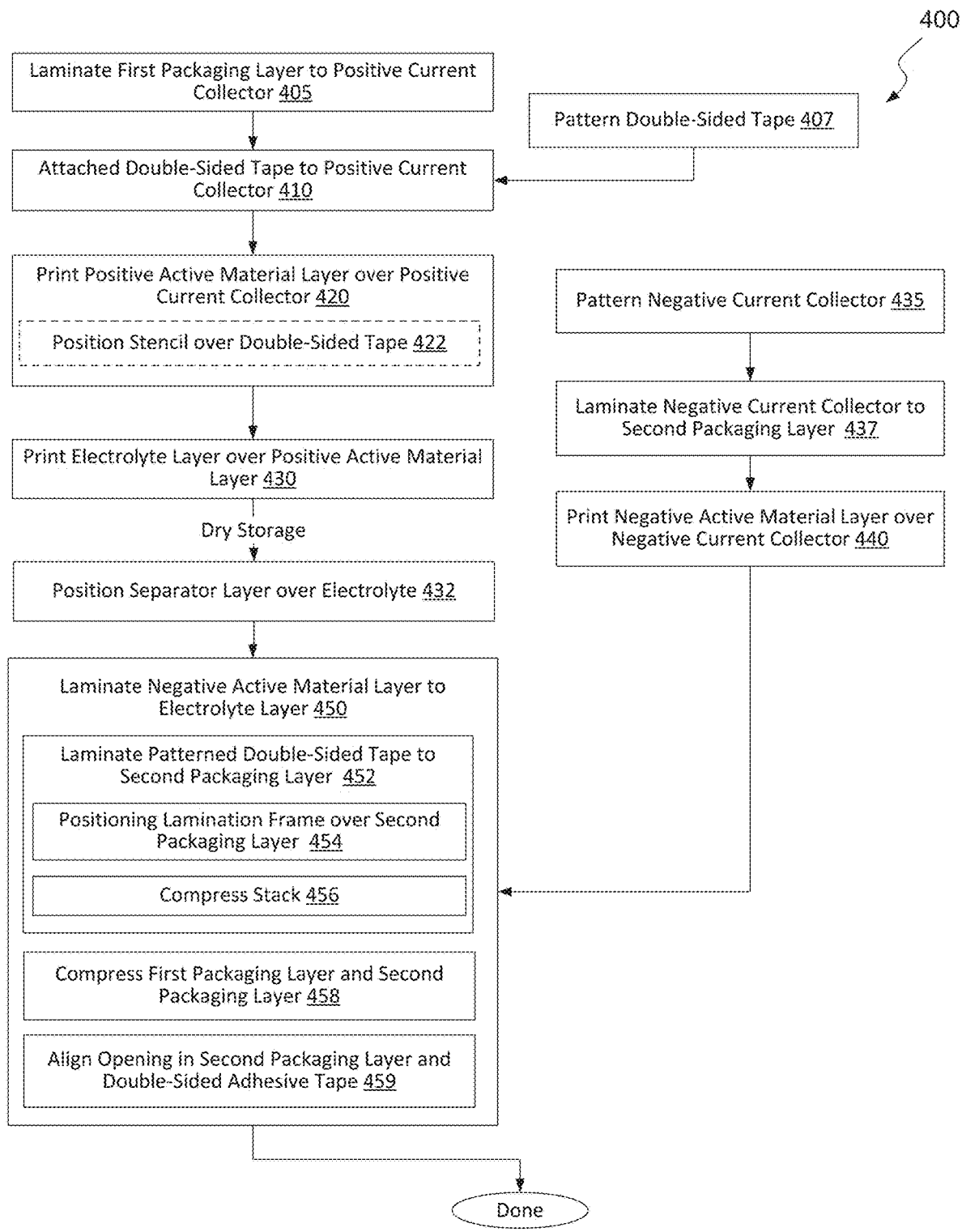
FIG. 4A is a process flowchart corresponding to a method of fabricating an electrochemical cell in FIG. 1, in accordance with some examples.

FIG. 4A is a processing flowchart corresponding to method 400 of fabricating printed electrochemical cell 100, in accordance with some examples. Various examples of electrochemical cell 100 are described above. In some examples, method 400 comprises laminating (block 405) first packaging layer 110 to positive active material layer 140. This operation may be performed before printing (block 420) positive active material layer 140 over positive current collector 125. For example, first packaging layer 110 comprises an adhesive layer, e.g., pressure-sensitive adhesive layer, which is pressed against the surface of positive current collector 125 (e.g., a metal surface or a graphite surface). First packaging layer 110 provides insulation to this surface of positive current collector 125. In some examples, the edges of first packaging layer 110 and positive current collector 125 coincide. In other words, first packaging layer 110 and positive current collector 125 have the same footprint.

In some examples, method 400 comprises patterning (block 410) double-sided adhesive tape 170. The pattern of double-sided adhesive tape 170 later defines the printed area of one or more active material and printed electrolyte layers. In other words, double-sided adhesive tape 170 sets the boundary for material distribution while printing one or more of these layers.

Figure 5A:
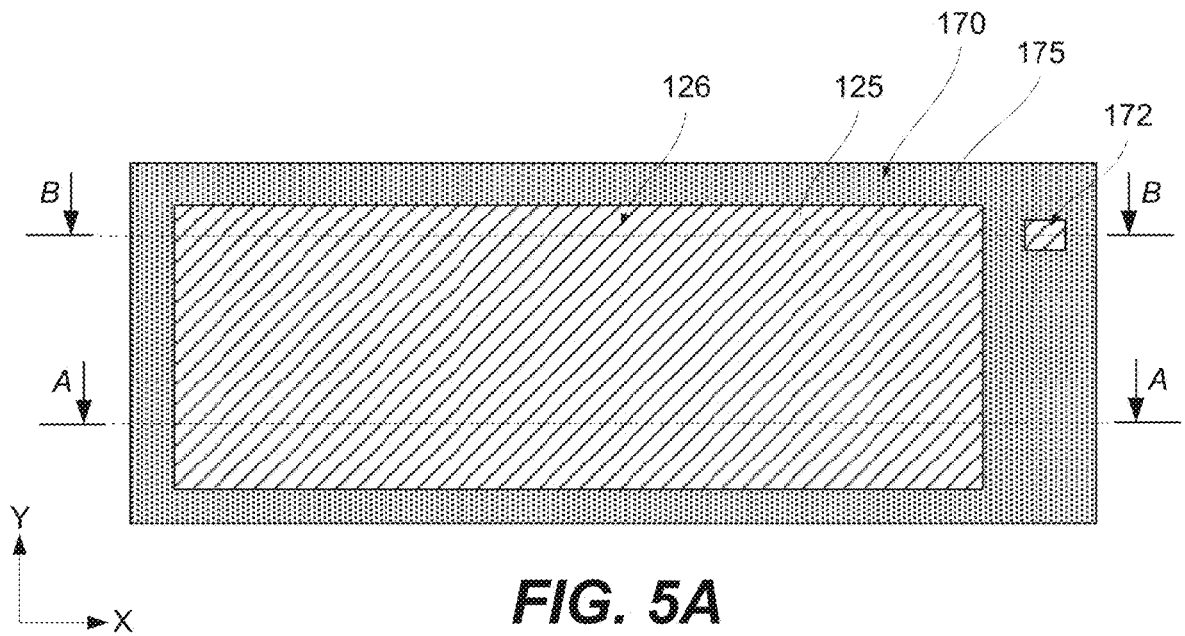
FIGS. 5A-5I are schematic views of different stages during the fabrication of an electrochemical cell, in accordance with some examples.
Figure 5B:
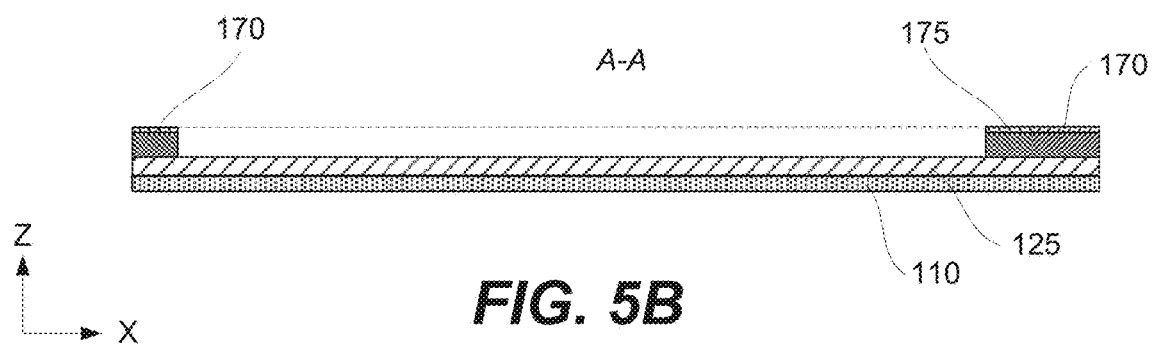
Figure 5C:
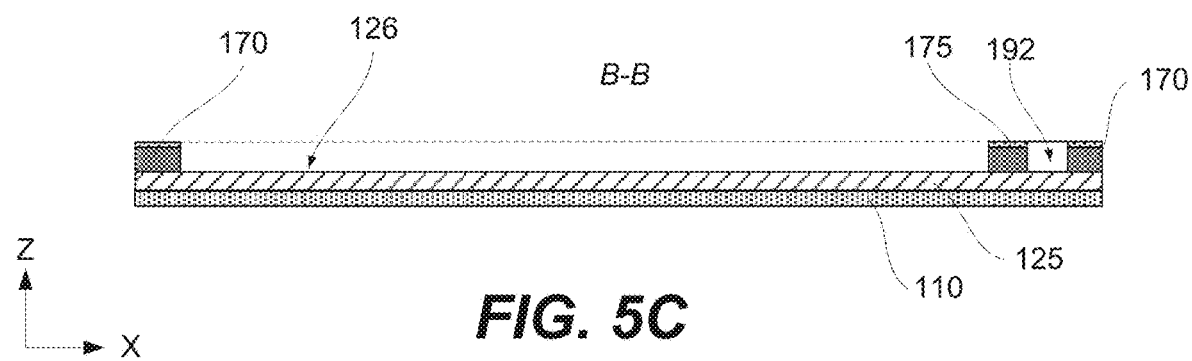

In some examples, method 400 comprises attaching (block 410) double-sided adhesive tape 170 to positive current collector 125. For example, positive current collector 125 comprises electrolyte-facing surface 126, to which double-sided adhesive tape 170 is attached. A subassembly formed during this operation is shown in FIGS. 5A, 5B, and 5C. Specifically, FIGS. 5A and 5B are two side cross-sectional views of a subassembly comprising first packaging layer 110, positive current collector 125, and double-sided adhesive tape 170. Double-sided adhesive tape 170 comprises release liner 175, e.g., to protect an adhesive layer of double-sided adhesive tape 170 from contamination during processing. The locations of these cross-sections are shown in FIG. 5C, which illustrates a top view of this subassembly. FIGS. 5B and 5C illustrate adhesive tape opening 172, which is used to form positive contact opening 191 in electrochemical cell 100. Adhesive tape opening 172 exposes a portion of positive current collector 125.

As shown in FIG. 5C, double-sided adhesive tape 170 (positioned under release liner 175) defines a printed area in this subassembly on the portion of positive current collector 125 or, more specifically, on electrolyte-facing surface 126 of positive current collector 125. Double-sided adhesive tape 170 masks a portion of positive current collector 125 or, more specifically, electrolyte-facing surface 126 when positive active material layer 140 is formed on electrolyte-facing surface 126 in later operations. In some examples, double-sided adhesive tape 170 forms an enclosed boundary as, e.g., shown in FIG. 5C. Various shapes of these cavities are within the scope. The shape of this cavity is defined by the cutout of double-sided adhesive tape 170. It should be noted that the cavity is open on the top for printing other components over electrolyte-facing surface 126. This boundary is used to constrain (from spreading) materials when these components formed over electrolyte-facing surface 126.

Figure 5D:
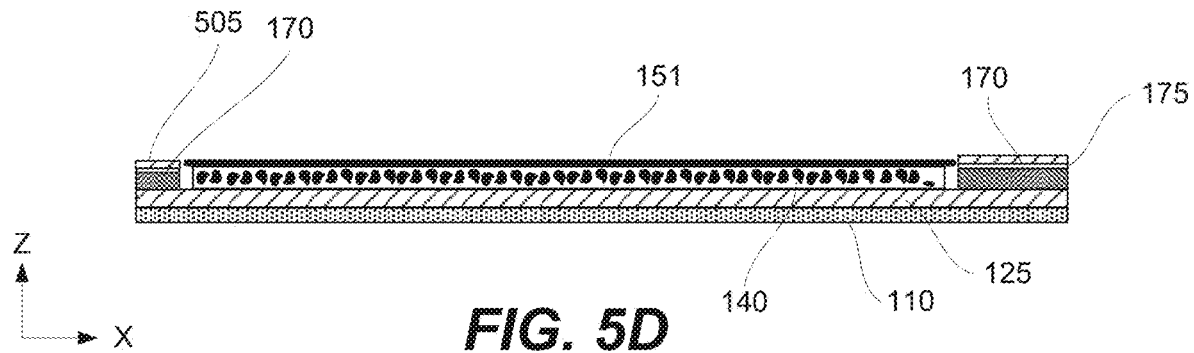

Referring to FIG. 4A, in some examples, method 400 comprises printing (block 420) positive active material layer 140 using positive electrode ink 610 over positive current collector 125. As noted above, positive current collector 125 may have a two-dimensional (2D) shape and comprises electrolyte-facing surface 126 formed by the graphite. During this printing operation, positive electrode ink 610 interfaces electrolyte-facing surface 126. FIG. 5D illustrates a cell sub-assembly after positive active material layer 140 is printed. In some examples, positive active material layer 140 is fully surrounded by double-sided adhesive tape 170. As such, positive active material layer 140 does not need to be fully solid. For example, positive active material layer 140 may contain or be partially liquid. Double-sided adhesive tape 170 prevents these liquid components from escaping the boundary. In some examples, printing positive active material layer 140 comprises drying positive electrode ink 610 disposed on positive current collector 125.

Figure 6A:
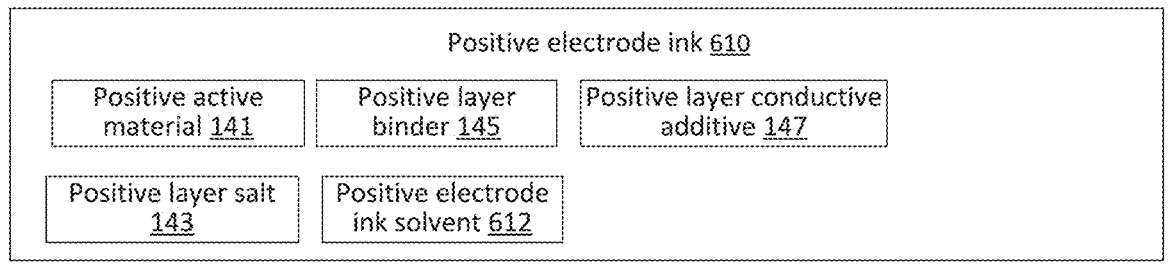
FIGS. 6A-6C are schematic block diagrams of different inks used during the fabrication of an electrochemical cell, in accordance with some examples.

Positive active material layer 140 is printed using positive electrode ink 610, schematically shown in FIG. 6A. In some examples, positive electrode ink 610 comprises positive active material 141 and positive layer binder 145. Another component, which is optional, is conductive additive 147. Various examples of these materials are described above with reference to FIG. 3A. Other possible components of positive electrode ink 610 are positive electrode ink solvent 612 and/or positive layer salt 143. In some examples, positive electrode ink solvent 612 is at least partially removed while forming positive active material layer 140, e.g., during a layer of positive electrode ink 610 after printing this layer over positive current collector 125. In some examples, substantially all (e.g., at least 95% by weight) of positive electrode ink solvent 612 is removed. Alternatively, at least some of positive electrode ink solvent 612 is retained in electrochemical cell 100 and may function as electrolyte solvent 152. Similarly, positive layer salt 143, when present in positive electrode ink 610, may be retained in electrochemical cell 100 and may function as electrolyte salt 153.

In some examples, first packaging layer 110 is laminated to positive current collector 125 prior to this printing operation. As such, after printing (block 420) positive active material layer 140 over positive current collector 125, positive current collector 125 is positioned between first packaging layer 110 and positive active material layer 140.

In some examples, printing (block 420) positive active material layer 140 comprises positioning (block 422) stencil 505 over double-sided adhesive tape 170. In these examples, a combined thickness of double-sided adhesive tape 170 and stencil 505 defines the thickness of positive active material layer 140 as described above. It should be noted that the thickness of positive active material layer 140 can change depending on drying of positive active material layer 140 (e.g., solvent removal).

Referring to FIG. 4A, in some examples, method 400 comprises printing (block 430) electrolyte 151 over positive active material layer 140. As noted above, electrolyte 151 comprises electrolyte salt 153 and electrolyte solvent 152. Electrolyte salt 153 comprises a zinc salt with a concentration of at least 30% by weight in electrolyte 151. Electrolyte solvent 152 comprises water. FIG. 5D illustrates a cell sub-assembly after electrolyte 151 is printed.

Figure 6B:
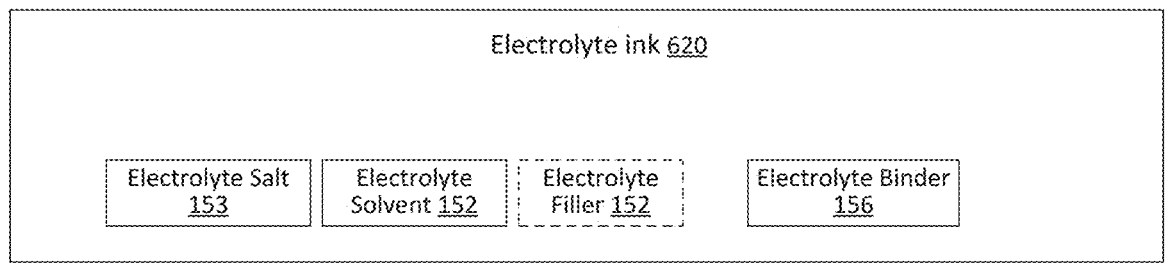
Figure 6C:
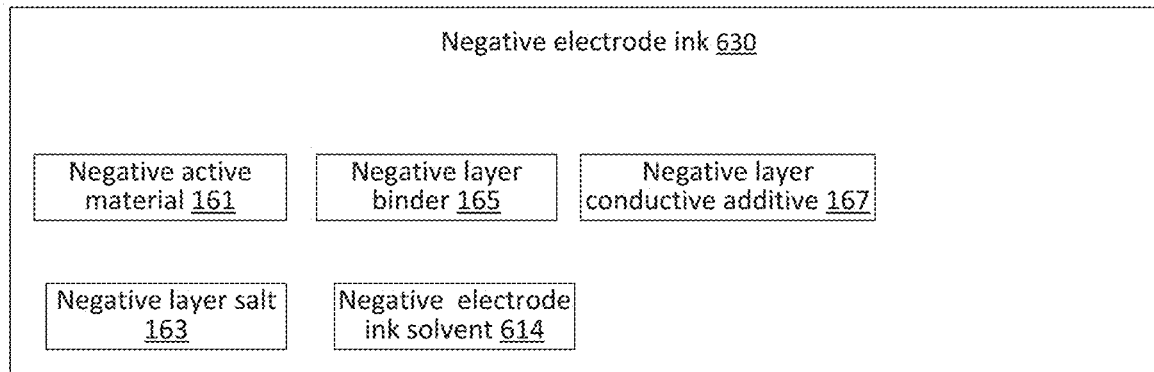

Electrolyte 151 is printed using electrolyte ink 620, which is identified in a block diagram in FIG. 6B. In some examples, electrolyte ink 620 comprises electrolyte salt 153, electrolyte solvent 152, electrolyte filler 154, and/or electrolyte binder 156. Various examples of these materials are described above with reference to FIG. 3A. Some of these materials are optional. For example, electrolyte 151 may be provided as a solid porous separator. The electrolyte salt 153 and electrolyte solvent 152 are added to this solid porous separator after laminating this separator to one or both of positive electrode 120 and negative electrode 180. In another example, electrolyte ink 620 is printed with electrolyte salt 153 and electrolyte solvent 152. The content of electrolyte salt 153 and/or electrolyte solvent 152 may be still adjusted in electrolyte 151 after printing electrolyte ink 620, e.g., by evaporating electrolyte solvent 152 from the printed layer or displacing one or more components from one or more adjacent layers (e.g., positive electrode 120 and negative electrode 180) after lamination of electrolyte 151 to these layers.

In some examples, double-sided adhesive tape 170 comprises release liner 175. Release liner 175 is removed after printing electrolyte 151 and before laminating (block 450) negative electrode 180. For example, release liner 175 may be peeled off to expose an adhesive layer.

Referring to FIG. 4B, electrolyte 151 or, more specifically, an electrolyte layer can be printed (block 462) on positive electrode 120 (e.g., over positive active material layer 140), can be printed (block 464) on negative electrode 180 (e.g., over negative active material layer 160), and/or can be printed (block 466) on over separator layer 150 (e.g., on one or both sides). This number of printing options allows for controlling the distribution of electrolyte 151 within the cell and also for controlling over the total amount of electrolyte 151 introduced into the cell. As further described below in the experimental results section, the total amount of electrolyte 151 greatly impacts the cell performance. However, electrolyte 151 needs to be evenly distributed and maintained (without leaking) within the cell.

Figure 5E:
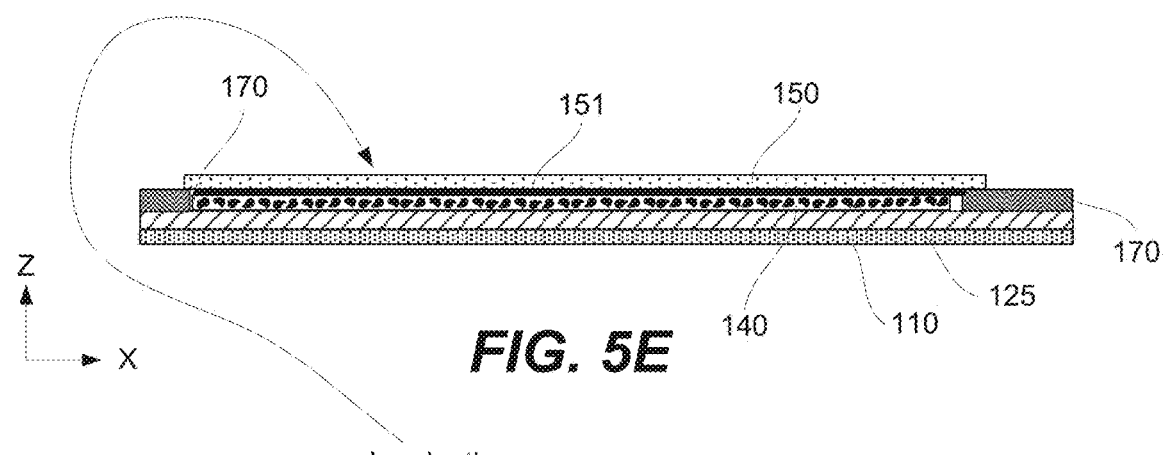

Referring to FIG. 4A, in some examples, method 400 comprises positioning (block 432) separator layer 150 over electrolyte 151. Electrolyte 151 can provide adhesion of separator layer 150 to positive electrode 120. In some examples, separator layer 150 extends, at least partially, over double-sided adhesive tape 170 as, e.g., is schematically shown in FIG. 5E.

Referring to FIG. 4A, in some examples, method 400 comprises patterning (block 435) negative current collector 185. For example, a continuous metal sheet may be patterned while supported on second packaging layer 190 or a temporary substrate. If the temporary substrate is used, method 400 may proceed with laminating (block 437) negative current collector 185 to second packaging layer 190. Alternatively, second packaging layer 190 is attached to the continuous metal sheet prior to the patterning.

Figure 5F:
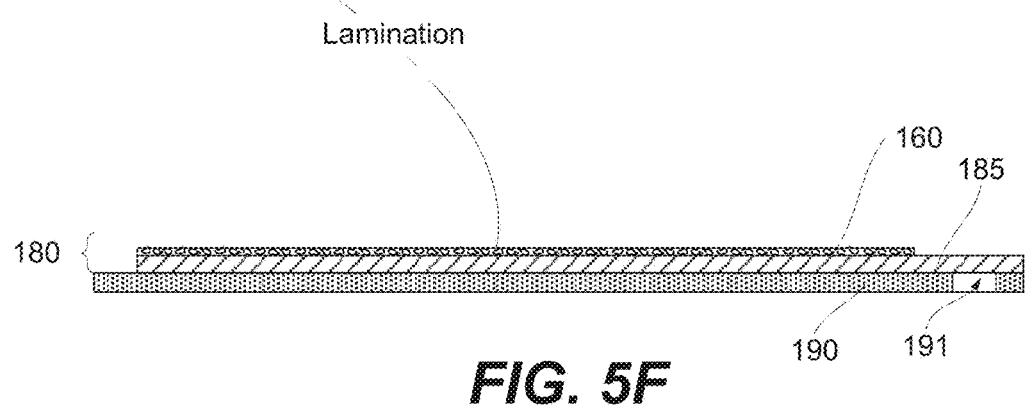
Figure 5G:
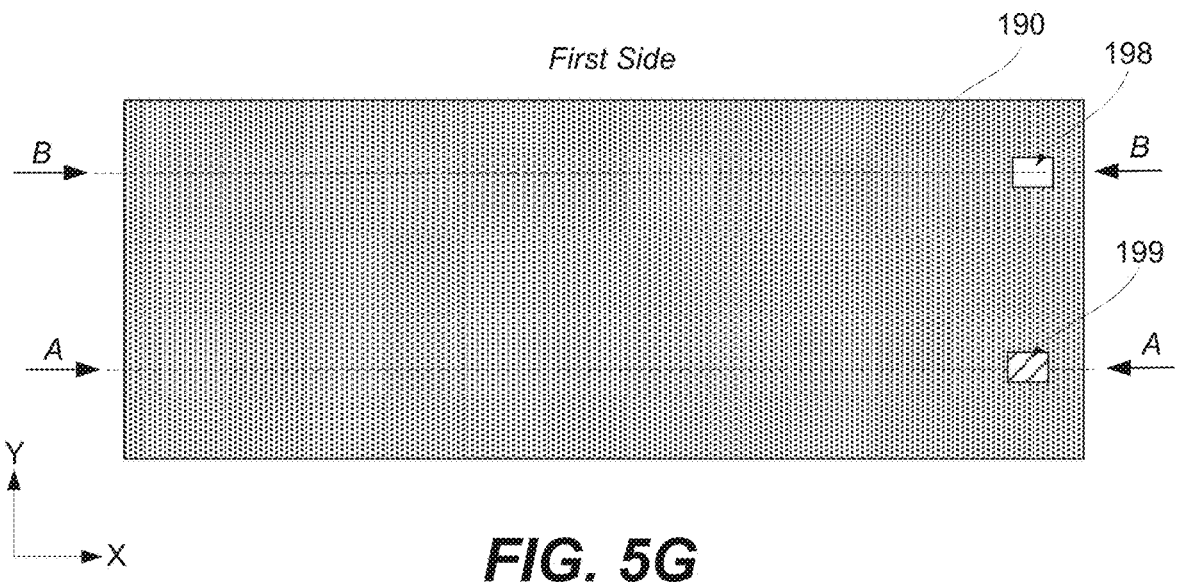
Figure 5H:
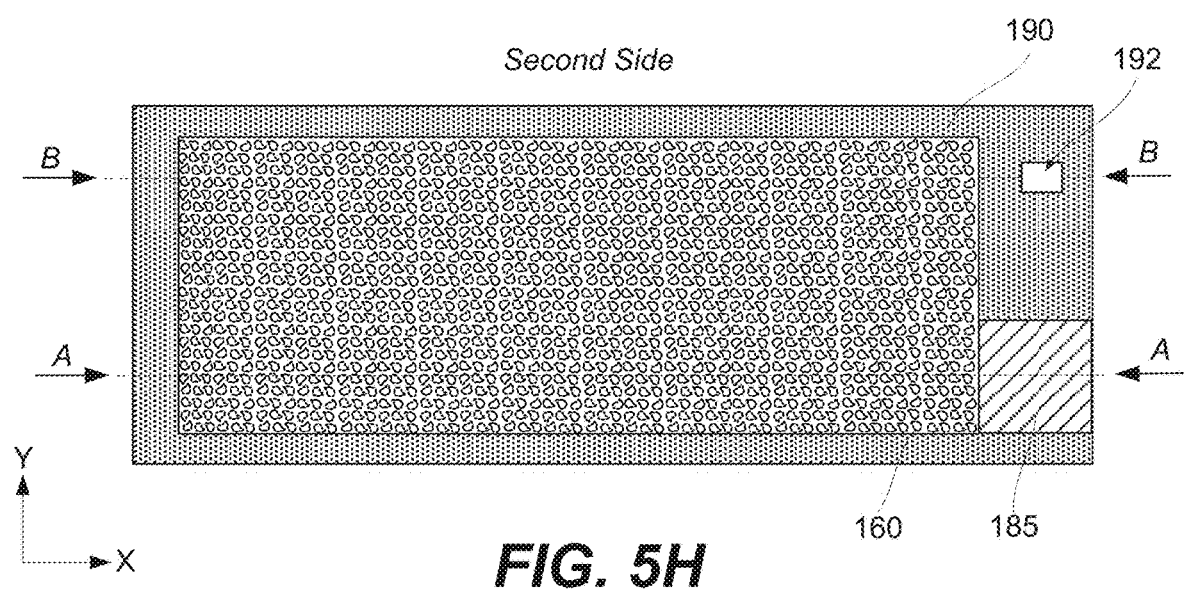

In some examples, second packaging layer 190 comprises first packaging layer opening 198 and/or second packaging layer opening 199 as, e.g., is schematically shown in FIGS. 5F, 5G, and 5H. These openings are used to form and become parts of positive contact opening 191 and negative contact opening 192, respectively, which are described above with reference to FIG. 2A. It should be noted that after laminating negative current collector 185 to second packaging layer 190, second packaging layer opening 199 overlap with negative current collector 185, while first packaging layer opening 198 is positioned away from negative current collector 185 as, e.g., is schematically shown in FIG. 5G.

Referring to FIG. 4A, in some examples, method 400 comprises printing (block 440) negative active material layer 160 over negative current collector 185 as, e.g., is schematically shown in FIGS. 5F, 5G, and 5H. In the shown example, negative current collector 185 is free from double-sided adhesive tape 170 during this printing operation. Alternatively, double-sided adhesive tape 170 is positioned on negative current collector 185, defining the printing area for negative active material layer 160 (like the one described above with reference FIGS. 5A-5E showing positive electrode 120). For example, double-sided adhesive tape 170 is positioned on negative current collector 185 and not on positive current collector 125. Alternatively, double-sided adhesive tape 170 is positioned on each of negative current collector 185 and positive current collector 125. In either case, after this printing operation, negative current collector 185 is positioned between second packaging layer 190 and negative active material layer 160.

Negative active material layer 160 is printed using negative electrode ink 630. Referring to FIG. 6B, in some examples, negative electrode ink 630 comprises negative active material 161 and negative layer binder 1665. Another component, which is optional, is conductive additive 167. Various examples of these materials are described above with reference to FIG. 3A. Other possible components of negative electrode ink 630 are negative electrode ink solvent 614 and/or negative layer salt 163. In some examples, negative electrode ink solvent 614 is at least partially removed while forming negative active material layer 160, e.g., during a layer of negative electrode ink 630 after printing this layer over negative current collector 185. In some examples, substantially all (e.g., at least 95% by weight) of negative electrode ink solvent 614 is removed. Alternatively, at least some of negative electrode ink solvent 614 is retained in electrochemical cell 100 and may function as electrolyte solvent 152. Similarly, negative layer salt 163, when present in negative electrode ink 630, may be retained in electrochemical cell 100 and may function as electrolyte salt 153.

Second packaging layer 190 may be laminated to negative current collector 185 before or after printing negative active material layer 160 over negative current collector 185. FIGS. 5F, 5G, and 5H illustrate a sub-assembly comprising negative electrode 180, comprising negative current collector 185 and negative active material layer 160, and second packaging layer 190, laminated to negative current collector 185.

Figure 5I:
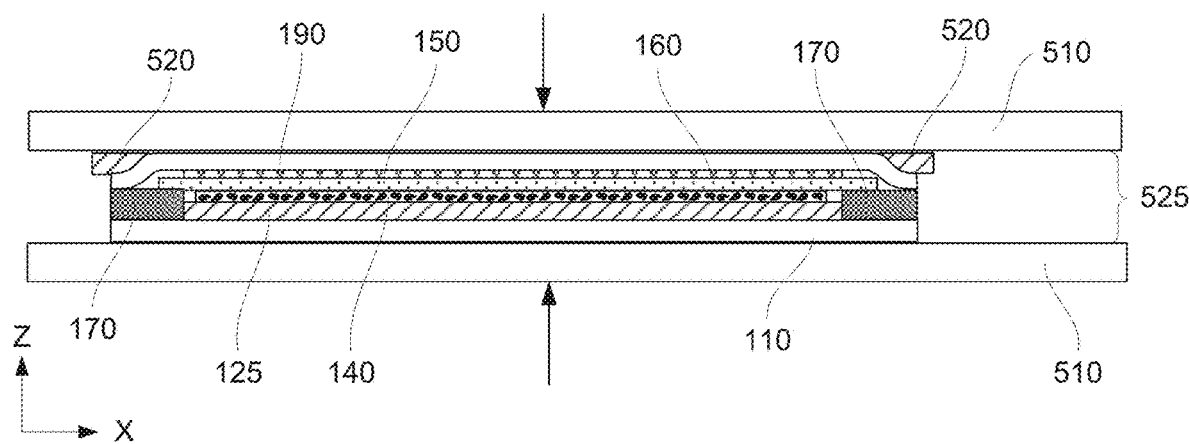

Referring to FIG. 4A, in some examples, method 400 comprises laminating (block 450) negative electrode 180 to electrolyte 151 as, e.g., schematically shown in FIGS. 5E, 5F, and 5I. As noted above, negative electrode 180 comprises negative active material layer 160 and negative current collector 185. After this laminating operation, negative active material layer 160 interfaces electrolyte 151. FIG. 5I illustrates a cell sub-assembly after negative electrode 180 is laminated to electrolyte 151. In some examples, laminating (block 450) negative electrode 180 to electrolyte 151 comprises laminating (block 452) double-sided adhesive tape 170 to second packaging layer 190. Alternatively, if double-sided adhesive tape 170 is a part of the negative electrode assembly, then this lamination operation comprises laminating double-sided adhesive tape 170 to first packaging layer 110. In yet additional examples, double-sided adhesive tape 170 that is a part of the negative electrode assembly is laminated to double-sided adhesive tape 170 that is a part of the positive electrode assembly. The lamination operation may be performed using lamination plates 510 as, e.g., is schematically shown in FIG. 5I.

In some examples, laminating (block 452) double-sided adhesive tape 170 to second packaging layer 190 comprises positioning (block 454) lamination frame 520 over second packaging layer 190 as, e.g., is schematically shown in FIG. 5I. Lamination frame 520 provides out-of-plane deviation of lamination plates 510, which are typically planar.

More specifically, lamination frame 520 is aligned with double-sided adhesive tape 170 such that first packaging layer 110, double-sided adhesive tape 170, second packaging layer 190, and lamination frame 520 form stack 525. In these examples, laminating (block 452) double-sided adhesive tape 170 to second packaging layer 190 further comprises compressing (block 456) stack 525 thereby sealing at least negative electrode 180, electrolyte 151, and positive active material layer 140 from the environment. In some examples, stack 525 is formed in part by a portion of positive current collector 125 extending past positive active material layer 140.

In some examples, laminating (block 450) negative electrode 180 to electrolyte 151 comprises compressing (block 458) first packaging layer 110 and second packaging layer 190 thereby increasing the interface contact between electrolyte 151 and each of negative active material layer 160 and positive active material layer 140. In some examples, laminating (block 450) negative electrode 180 to electrolyte 151 comprises aligning (block 459) opening in second packaging layer 190 and double-sided adhesive tape 170 collectively forming negative contact opening 192 after negative electrode 180 is laminated to electrolyte 151.

Experimental Results

Figure 7A:
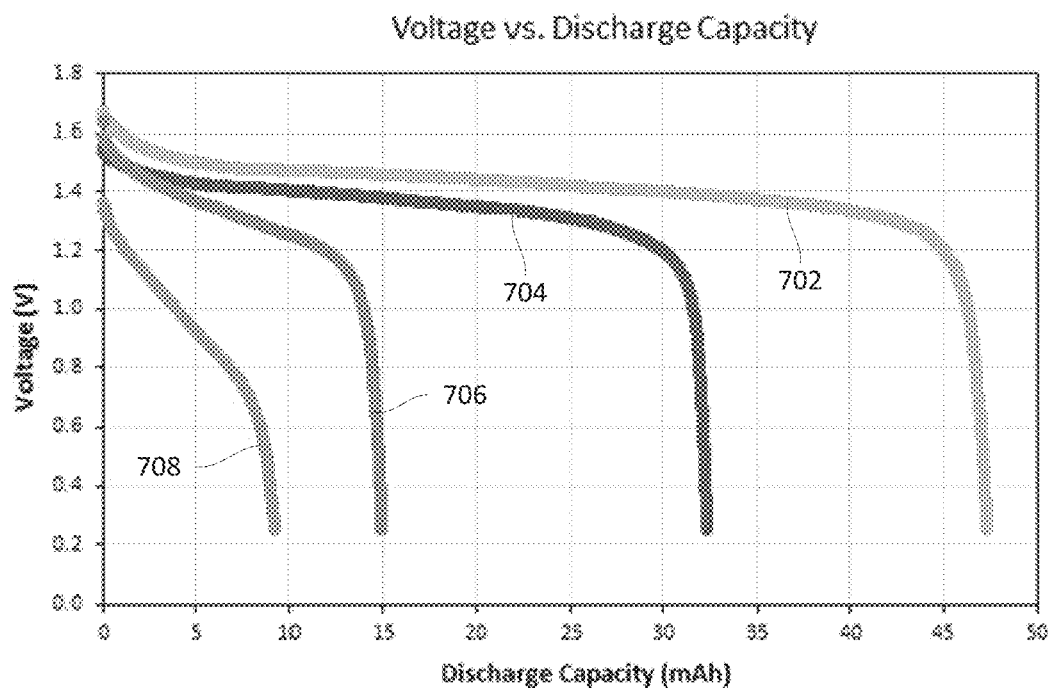
FIGS. 7A-7H are experimental data showing the performance of electrochemical cells.
Figure 7B:
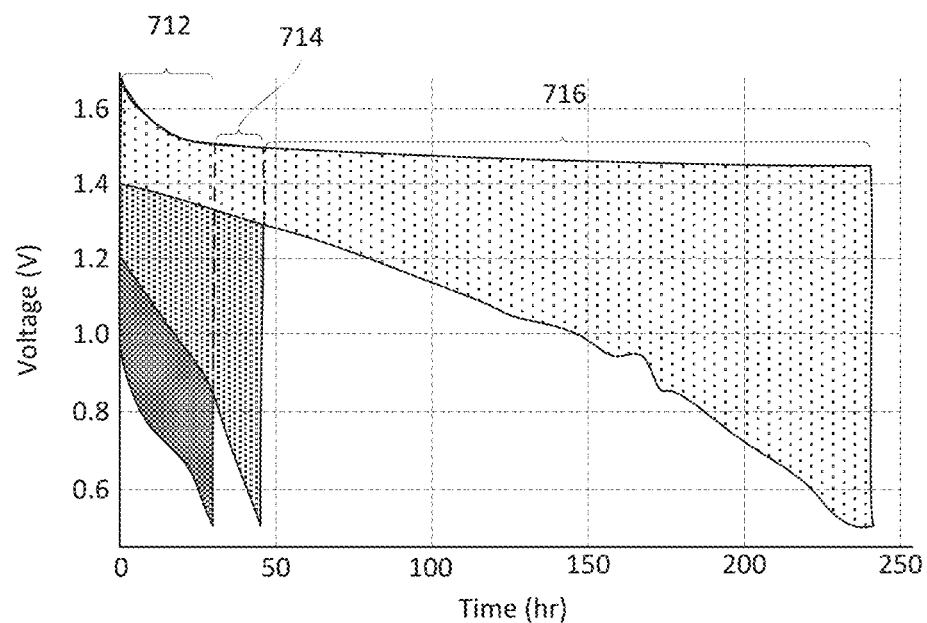
Figure 7C:
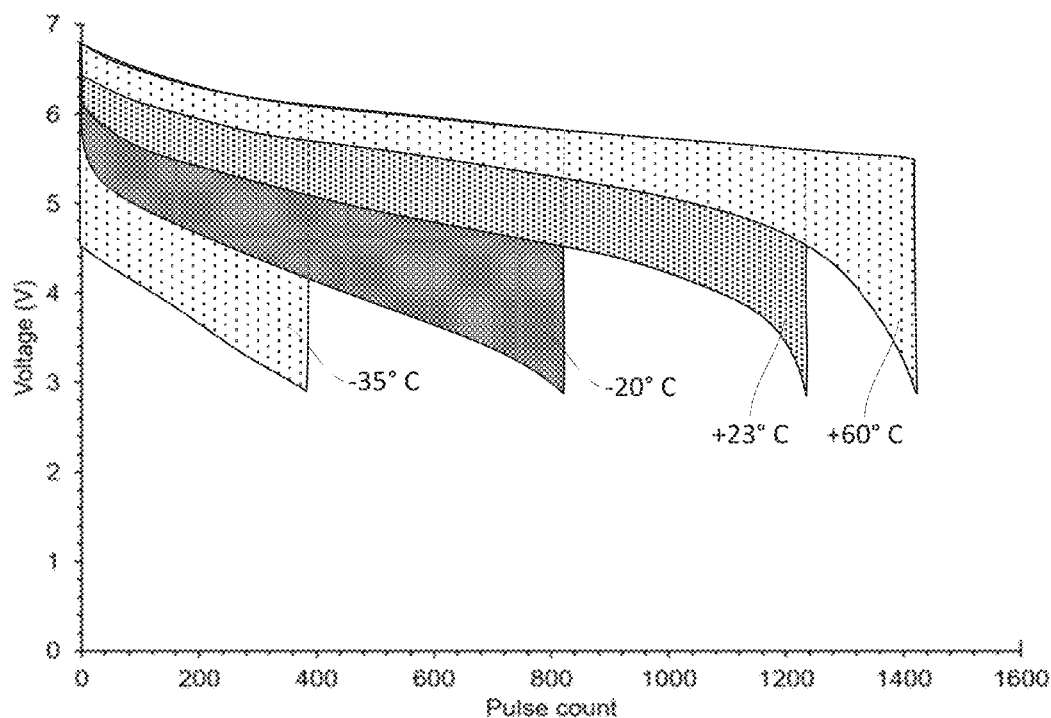
Figure 7D:
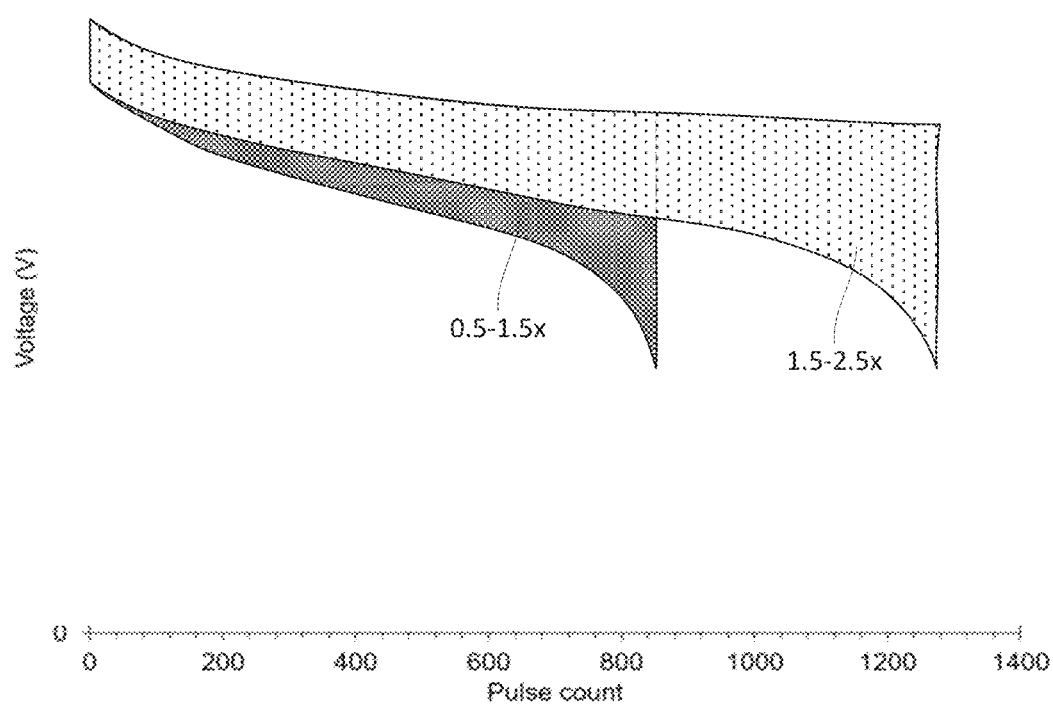

FIGS. 7A and 7B illustrate cell performance results for cells fabricated in accordance with this disclosure. Specifically, FIG. 7A illustrates voltage plots as a function of the discharge capacity for different discharge rates. Line 702 represents a 0.3 mA discharge rate, line 704 represents a 1 mA discharge rate, line 706 represents a 10 mA discharge rate, and line 708 represents a 100 mA discharge rate. FIG. 7B illustrates voltage scan plots as a function of time for different pulse currents. Area 712 represents a 200 mA pulse current, area 714 represents a 130 mA pulse current, area 716 represents a 45 mA pulse current. FIG. 7C illustrates voltage scan plots at different temperatures, indicating the cells prepared in accordance with the methods described above are operable over a wide-range of temperatures. The pulse protocol used for this test was 80 mA for 3 seconds and 278 mA for 0.2 seconds—typical for cellular applications, which is a typical power protocol for cellular applications. FIG. 7D illustrates two voltage scan plots comparing different amounts of electrolyte, presented as weight ratios (the electrolyte weight to the weight of the as a function of the positive active material weight). Specifically, increasing the weight from 0.5-1.5× to 1.5-2.5× increases the pulse capability from about 900 pulses to about 1300 pulses.

Figure 7E:
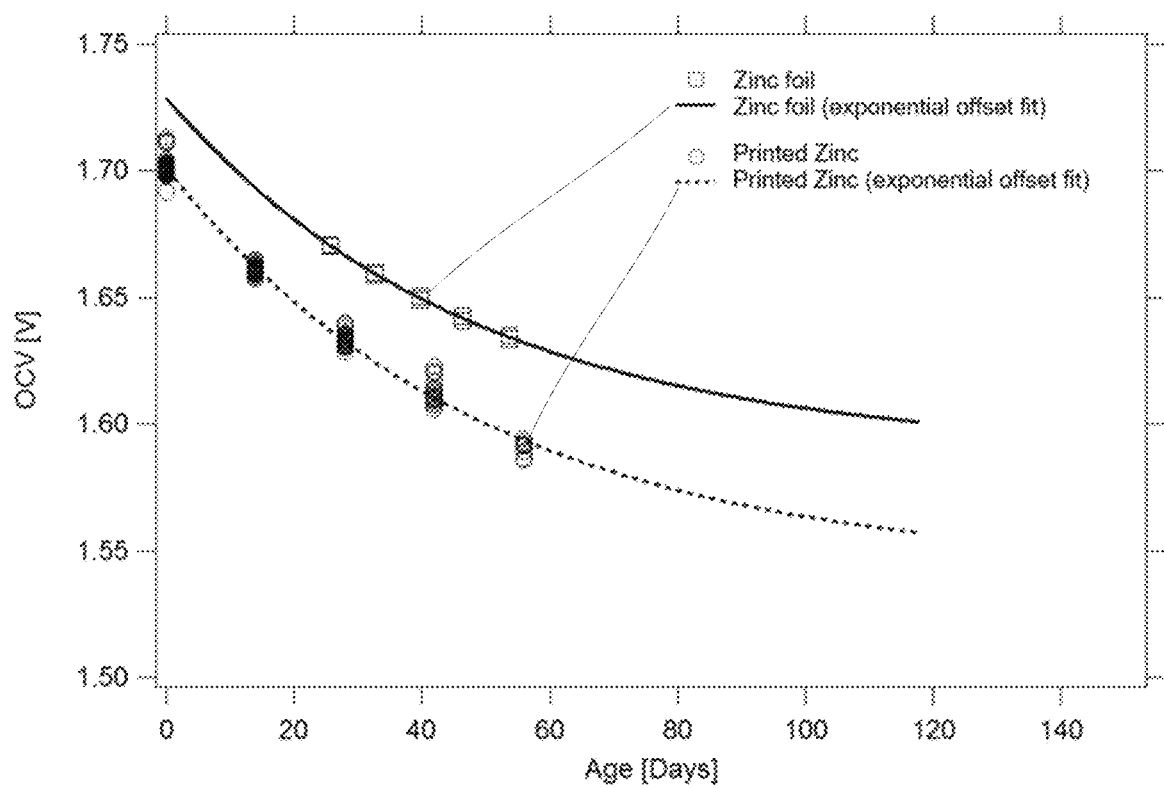
Figure 7F:
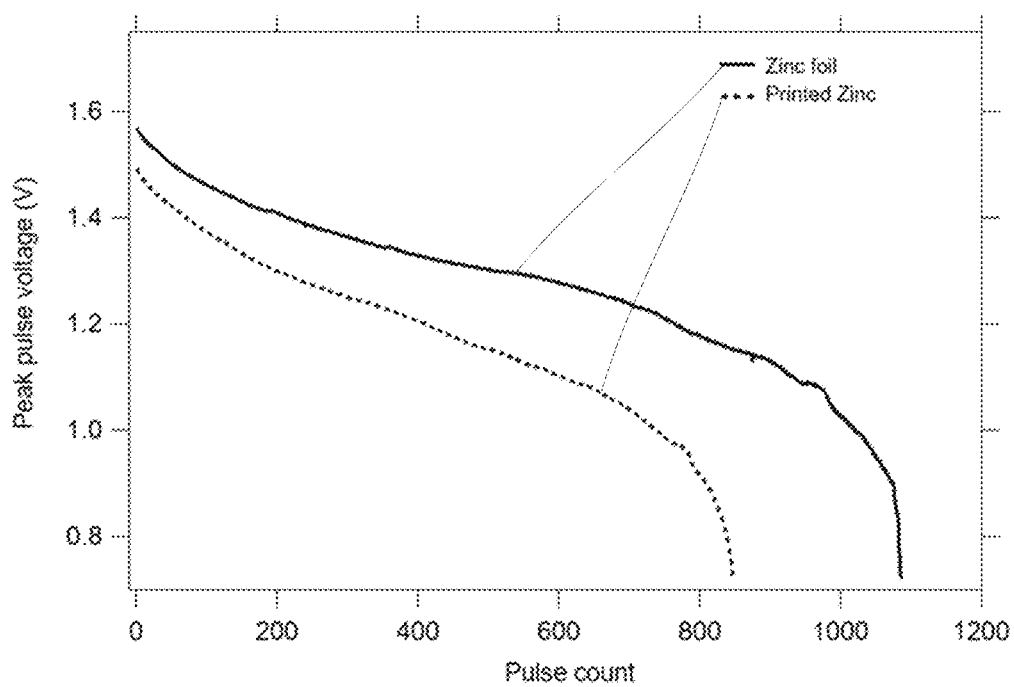
Figure 7G:
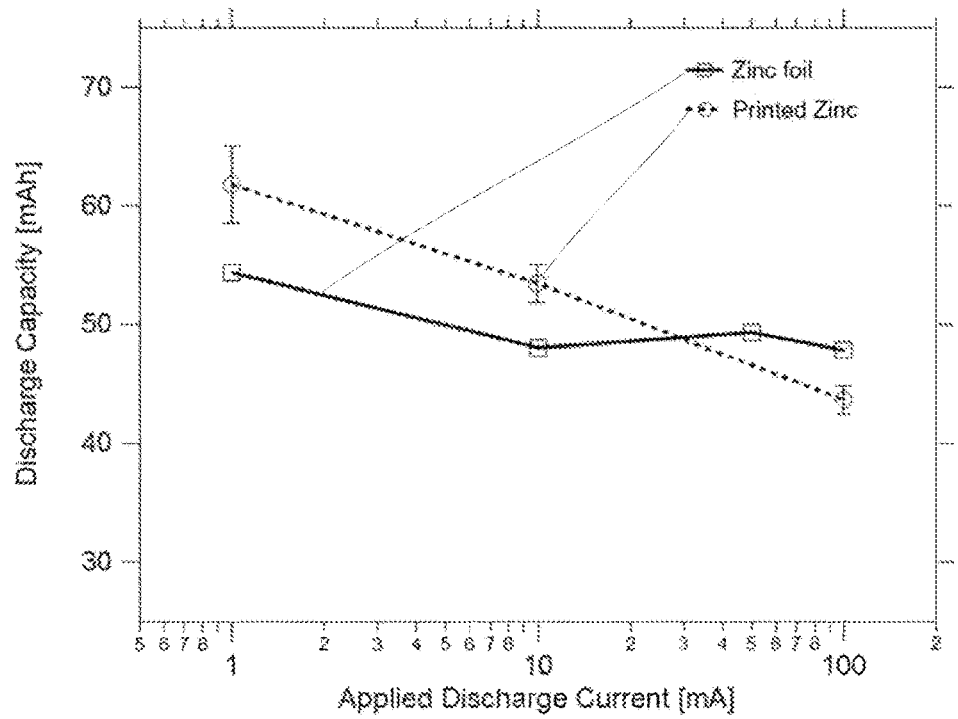

FIGS. 7E-7G compare the performance of a zinc foil (used as a negative electrode, both as an active layer and as a current collector) and a printed negative electrode in which zinc is presented in a powder form. It should be noted that powdered zinc has a larger exposed surface area than the zinc foil resulting in poor aging of the cells with printed negative electrodes (FIG. 7E) and poor cycle life (FIG. 7F) but better power performance (FIG. 7G)

Figure 7H:
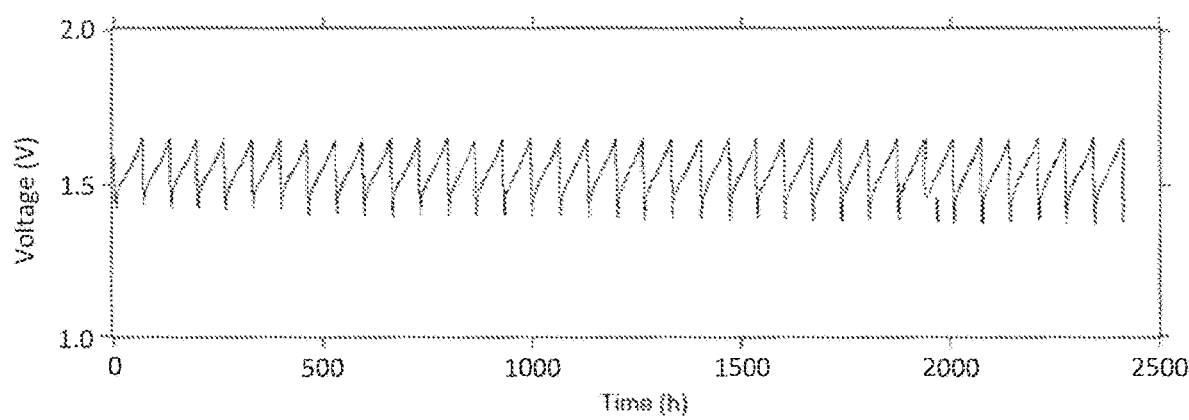

Finally, FIG. 7H illustrates the rechargeability of a cell with a printed zinc-based negative electrode at ambient conditions. The cycling test is performed at 25% depth of discharge with a charging cutoff voltage of 1.65 V. FIG. 7H illustrates over 35 cycles (equivalent to 100 days) with the test continuing.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A printed electrochemical cell comprising:
a positive electrode comprising a positive current collector and a positive active material layer, wherein the positive current collector has a two-dimensional shape and comprises an electrolyte-facing surface consisting of graphite;
a negative electrode comprising a negative active material layer;
a separator layer positioned between the positive electrode and the negative electrode and comprising an electrolyte providing ionic communication between the positive electrode and the negative electrode, wherein the electrolyte comprises a zinc salt with a concentration of at least 30% by weight and water;
a first packaging layer, a second packaging layer, and a double-sided adhesive tape, with the double-sided adhesive tape: i) surrounding at least a portion of each of the negative active material layer, the separator layer, and the positive active material layer, and ii) sealably attached to at least one of the first packaging layer and the second packaging layer, and wherein the double-sided adhesive tape and the second packaging layer comprise a positive contact opening extending to the electrolyte-facing surface of the positive current collector and exposing at least a portion of the electrolyte-facing surface within the positive contact opening;
a positive contact via including a double-headed eyelet that protrudes through and compresses portions of both of the first packaging layer and the second packaging layer and wherein the positive contact via is positioned within the positive contact opening and protruding through the double-sided adhesive tape and the second packaging layer to form: i) a battery terminal, and ii) an electrical connection to the electrolyte-facing surface of the positive current collector.

2. The printed electrochemical cell of claim 1, wherein the positive current collector is one of a graphite foil or an aluminum foil with a graphite coating and wherein the electrolyte-facing surface of the positive current collector is pin-hole-free.

3. The printed electrochemical cell of claim 1, wherein:
the positive electrode, the separator layer, the electrolyte, and the negative electrode are positioned between the first packaging layer and the second packaging layer,
the first packaging layer, the positive current collector, and the second packaging layer form a cell edge such that at least the electrolyte-facing surface of the positive current collector provides an outgassing path to the cell edge.

4. The printed electrochemical cell of claim 1, wherein:
the double-sided adhesive tape is sealed against the electrolyte-facing surface of the positive current collector, and
the positive current collector is positioned between the first packaging layer and the double-sided adhesive tape and is laminated to the first packaging layer.

5. The printed electrochemical cell of claim 1, wherein the double-sided adhesive tape has a thickness of within 25% of a combined thickness of the positive active material layer, the separator layer, and the negative active material layer.

6. The printed electrochemical cell of claim 1, wherein the water has a concentration of at least 30% by weight in the electrolyte.

7. The printed electrochemical cell of claim 1, wherein the separator layer is a printed separator comprising a filler selected from the group consisting of silica, titania, and zinc oxide.

8. A printed electrochemical cell comprising:
a positive electrode comprising a positive current collector and a positive active material layer, wherein the positive current collector has a two-dimensional shape and comprises an electrolyte-facing surface consisting of graphite;
a negative electrode comprising a negative active material layer;
a separator layer positioned between the positive electrode and the negative electrode and comprising an electrolyte providing ionic communication between the positive electrode and the negative electrode, wherein the electrolyte comprises a zinc salt with a concentration of at least 30% by weight and water;
a first packaging layer, a second packaging layer, and a double-sided adhesive tape, with the double-sided adhesive tape: i) surrounding at least a portion of each of the negative active material layer, the separator layer, and the positive active material layer, and ii) sealably attached to at least one of the first packaging layer and the second packaging layer, and wherein the double-sided adhesive tape and the first packaging layer comprise a negative contact opening extending to the electrolyte-facing surface of the negative current collector and exposing at least a portion of the electrolyte-facing surface within the negative contact opening;
a negative contact via including a double-headed eyelet that protrudes through and compresses portions of both of the first packaging layer and the second packaging layer and wherein the negative contact via is positioned within the negative contact opening and protruding through the double-sided adhesive tape and the first packaging layer to form: i) a battery terminal, and ii) an electrical connection to the electrolyte-facing surface of the negative current collector.

* * * * *